(12) United States Patent  
Alspach et al.

(10) Patent No.: US 12,304,088 B2  
(45) Date of Patent: May 20, 2025

(54) SYSTEMS AND METHODS FOR CALIBRATING DEFORMABLE SENSORS

(71) Applicant: Toyota Research Institute, Inc., Los Altos, CA (US)

(72) Inventors: Alexander Alspach, Somerville, MA (US); Naveen Suresh Kuppuswamy, Arlington, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 994 days.

(21) Appl. No.: 17/313,606

(22) Filed: May 6, 2021

(65) Prior Publication Data

US 2022/0355488 A1  Nov. 10, 2022

(51) Int. Cl.
*B25J 9/16* (2006.01)
*G01B 11/22* (2006.01)
(Continued)

(52) U.S. Cl.
CPC .............. *B25J 9/1697* (2013.01); *G01B 11/22* (2013.01); *G01L 9/0077* (2013.01); *G01L 27/002* (2013.01); *G06F 18/22* (2023.01); *G06T 7/0002* (2013.01); *G06T 7/60* (2013.01); *G06T 7/70* (2017.01); *G06F 18/24* (2023.01); *G06T 2207/10028* (2013.01)

(58) Field of Classification Search
CPC ....... B25J 9/1694; B25J 9/1697; G01B 11/22; G01L 27/002; G01L 9/0077; G06F 18/22; G06F 18/24; G06T 2207/10028; G06T 7/0002; G06T 7/0004; G06T 7/60; G06T 7/70; G05B 2219/39111

See application file for complete search history.

(56) References Cited

U.S. PATENT DOCUMENTS 1,980,626 A  12/1990 Hess et al.
7,263,412 B2  8/2007 Gutmann et al.
(Continued)

FOREIGN PATENT DOCUMENTS

CN  104015197 B  6/2016
CN  106956283 A  7/2017
(Continued)

OTHER PUBLICATIONS

T. Sakuma, E. Phillips, G. A. G. Ricardez, M. Ding, J. Takamatsu and T. Ogasawara, "A Parallel Gripper with a Universal Fingertip Device Using Optical Sensing and Jamming Transition for Maintaining Stable Grasps", pp. 5814-5819. (Year: 2019).*

(Continued)

*Primary Examiner* — Manuchehr Rahmjoo
(74) *Attorney, Agent, or Firm* — Dinsmore & Shohl LLP

(57) ABSTRACT

Systems and methods for calibrating deformable sensors are disclosed. In one embodiment, a method of calibrating a deformable sensor includes capturing image data of the deformable sensor using an external image sensor, wherein the deformable sensor comprises a deformable membrane defining an enclosure that is configured to be filled with a medium. The method further includes comparing the image data of the deformable sensor to a metric. When the image data does not satisfy the metric, the method includes adjusting a pressure within the enclosure.

14 Claims, 15 Drawing Sheets

(51) Int. Cl.
*G01L 9/00* (2006.01)
*G01L 27/00* (2006.01)
*G06F 18/22* (2023.01)
*G06T 7/00* (2017.01)
*G06T 7/60* (2017.01)
*G06T 7/70* (2017.01)
*G06F 18/24* (2023.01)

(56) References Cited

U.S. PATENT DOCUMENTS

| | | |
|---|---|---|
| 7,460,216 B2 | 12/2008 | Lecomte et al. |
| 7,620,477 B2 | 11/2009 | Bruemmer |
| 7,991,510 B2 | 8/2011 | Duan et al. |
| 8,231,158 B2 | 7/2012 | Dollar |
| 8,260,458 B2 | 9/2012 | Kim et al. |
| 8,286,509 B2 | 10/2012 | Igarashi et al. |
| 8,317,701 B2 | 11/2012 | Livne et al. |
| 8,409,900 B2 | 4/2013 | Huffman |
| 8,857,269 B2 | 10/2014 | Johnson et al. |
| 9,120,230 B2 | 9/2015 | Lipson et al. |
| 9,130,485 B2 | 9/2015 | Prahlad et al. |
| 9,333,648 B2 | 5/2016 | Kim et al. |
| 9,375,531 B1 | 6/2016 | Lee et al. |
| 9,605,952 B2 | 3/2017 | Rose et al. |
| 9,605,962 B2 | 3/2017 | Jordil |
| 9,630,316 B2 | 4/2017 | Konolige et al. |
| 9,757,862 B2 | 9/2017 | Alt et al. |
| 9,802,314 B2 | 10/2017 | Yamane et al. |
| 9,820,636 B2 | 11/2017 | Hart et al. |
| 9,857,245 B2 | 1/2018 | Onal et al. |
| 9,868,181 B2 | 1/2018 | Osato et al. |
| 9,880,066 B2 | 1/2018 | Larsen et al. |
| 9,916,491 B2 | 3/2018 | Bolea et al. |
| 9,981,382 B1 | 5/2018 | Strauss et al. |
| 10,197,399 B2 | 2/2019 | Wirbel et al. |
| 10,201,901 B2 | 2/2019 | Sato |
| 10,228,318 B1 | 3/2019 | Boyer et al. |
| 10,549,428 B2 | 2/2020 | Alspach et al. |
| 10,668,627 B2 | 6/2020 | Alspach et al. |
| 2007/0156066 A1 | 7/2007 | McGinley et al. |
| 2009/0326714 A1 | 12/2009 | Buckingham et al. |
| 2010/0201503 A1 | 8/2010 | Laurent et al. |
| 2010/0283727 A1 | 11/2010 | Jiang et al. |
| 2012/0133496 A1 | 5/2012 | Aono |
| 2012/0240691 A1 | 9/2012 | Wettels et al. |
| 2012/0261551 A1* | 10/2012 | Rogers ............... G02B 26/0825 359/619 |
| 2012/0307590 A1 | 12/2012 | Faruque |
| 2016/0147333 A1 | 5/2016 | Levesque et al. |
| 2017/0080571 A1 | 3/2017 | Wagner et al. |
| 2017/0100841 A1 | 4/2017 | Noda et al. |
| 2017/0239821 A1 | 8/2017 | Lessing et al. |
| 2018/0075299 A1 | 3/2018 | Gerber et al. |
| 2018/0161001 A1 | 6/2018 | Seip et al. |
| 2018/0246574 A1 | 8/2018 | Modarres et al. |
| 2018/0297214 A1 | 10/2018 | Lessing et al. |
| 2018/0319047 A1 | 11/2018 | Fei et al. |
| 2018/0361596 A1 | 12/2018 | Beri |
| 2019/0091871 A1 | 3/2019 | Alspach et al. |
| 2019/0091872 A1 | 3/2019 | Alspach et al. |
| 2019/0094869 A1 | 3/2019 | Artes et al. |
| 2019/0171004 A1 | 6/2019 | Bretagnot et al. |
| 2019/0234726 A1 | 8/2019 | Gifford et al. |
| 2019/0241298 A1* | 8/2019 | Brooks ............... A47F 9/04 |
| 2019/0346333 A1 | 11/2019 | Youceftoumi et al. |
| 2020/0201438 A1 | 6/2020 | Mandeville et al. |
| 2020/0246980 A1 | 8/2020 | Kuppuswamy et al. |
| 2020/0254624 A1 | 8/2020 | Alspach et al. |
| 2020/0270777 A1 | 8/2020 | Podhajny et al. |
| 2021/0016454 A1* | 1/2021 | Jeong ............... B23Q 7/046 |
| 2021/0302249 A1* | 9/2021 | Alspach ............... G01B 21/042 |

FOREIGN PATENT DOCUMENTS

| | | |
|---|---|---|
| CN | 207616561 U | 7/2018 |
| CN | 108908379 | 11/2018 |
| DE | 112010000828 T5 | 4/2013 |
| DE | 102016108460 A1 | 11/2017 |
| EP | 2502714 B1 | 5/2013 |
| EP | 2735408 B1 | 4/2016 |
| EP | 2986228 B1 | 11/2018 |
| FR | 2235565 A1 | 1/1975 |
| JP | 2004361085 A | 12/2004 |
| JP | 4163005 B2 | 10/2008 |
| JP | 5757724 B2 | 7/2015 |
| KR | 20060088769 A | 8/2006 |
| KR | 20170077877 A | 7/2017 |
| WO | 1994023605 A1 | 10/1994 |
| WO | 2000003210 A1 | 1/2000 |
| WO | 02063549 | 8/2002 |
| WO | 2009124211 A1 | 10/2009 |
| WO | 2010065398 A1 | 6/2010 |
| WO | 2013173624 A2 | 11/2013 |
| WO | 2015066260 A1 | 5/2015 |
| WO | 2017120314 A1 | 7/2017 |
| WO | 2017134092 A1 | 8/2017 |
| WO | 2017186705 A1 | 11/2017 |
| WO | 2018063100 A2 | 4/2018 |
| WO | 2018232326 A1 | 12/2018 |

OTHER PUBLICATIONS

Soft-bubble: A highly compliant dense geometry tactile sensor for robot manipulation (https://sci-hub.se/https://www.researchgate.net/publication/333428355_Soft-bubble_A_highly_compliant_dense_geometry_tactile_sensor_for_robot_manipulation), Apr. 18, 2019.

Dimitris Hristu et al., Technical Research Report, "The Performance of a Deformable-Membrane Tactile Sensor: Basic Results on Geometrically-Defined Tasks", Center for Dynamics and Control of Smart Structures (CDCSS), 1999, Harvard University and University of Maryland, 8 pages, http://www.dtic.mil/dtic/tr/fulltext/u2/a439988.pdf.

GelSight, Inc., "GelSight Benchtop Scanner", 2017, 1 page, http://www.gelsight.com/.

Alexander Alspach et al., "Design of a Soft Upper Body Robot for Physical Human-Robot Interaction", Disney Research, Pittsburgh, PA, Nov. 4, 2015, https://disneyresearch.com/publication/design-of-a-soft-upper-body-robot/, 8 pages.

Micah K. Johnson et al., "Retrographic sensing for the measurement of surface texture and shape", Jun. 20, 2009, 8 pages. DOI: 10.1109/CVPR.2009.5206534.

Micah K. Johnson et al., "Microgeometry Capture using an Elastomeric Sensor", ACM Trans. Graph. 30 (4) (2011) 46:1-46:8, doi:10.1145/2010324.1964941. 8 pages.

Leif P. Jentoft et al., "Determining Object Geometry with Compliance and Simple Sensors", In the Proceedings of the IEEE/RSJ International Conference on Intelligent Robots and Systems, San Francisco, CA, Sep. 25-30, 2011: 3468-3473, doi:10.1109/IROS.2011.6094692, http://nrs.harvard.edu/urn-3:HUL.InstRepos:22108933, 7 pages.

Joao Bimbo et al., "In-Hand Object Pose Estimation Using Covariance-Based Tactile To Geometry Matching", IEEE Robotics and Automation Letters, Jan. 2016, DOI: 10.1109/LRA.2016.2517244, https://www.researchgate.net/publication/290509006_In-Hand_Object_Pose_Estimation_Using_Covariance-Based_Tactile_To_Geometry_Matching, 9 pages.

Joohyung Kim et al., "3D Printed Soft Skin for Human-Robot Interaction", Disney Research, Sep. 28, 2015, 1 page.

Joohyung Kim et al., "3D Printed Soft Skin for Safe Human-Robot Interaction", Disney Research, Pittsburgh, PA, https://www.disneyresearch.com/publication/3dprinted-soft-skin/, Sep. 28, 2015, DOI: 10.1109/IROS.2015.7353705, 7 pages.

PCT International Search Report and Written Opinion of the International Searching Authority for PCT/US2020/053377 dated Jan. 19, 2021, 19 pages.

(56) References Cited

OTHER PUBLICATIONS

Alspach, Alex et al. "Soft-bubble: A highly compliant dense geometry tactile sensor for robot manipulation." 2019 2nd IEEE International Conference on Soft Robotics (RoboSoft). IEEE, Apr. 14-18, 2019, DOI: 10.1109/ROBOSOFT.2019.8722713.

Alvarez, David et al. "Tactile-Based In-hand Object Pose Estimation." ROBOT 2017: Third Iberian Robotics Conference. Nov. 2017, DOI: 10.1007/978-3-319-70836-2_59.

Nassouh, John et al. "Design of new Sensory Soft Hand: Combining air-pump actuation with superimposed curvature and pressure sensors." 2018 IEEE International Conference on Soft Robotics (RoboSoft). IEEE, Apr. 24-28, 2018, pp. 164-169, DOI: 10.1109/ROBOSOFT.2018.8404914.

Odhner, L. U. et al. "A compliant, underactuated hand for robust manipulation." The International Journal of Robotics Research 2014, vol. 33(5), pp. 736-752, DOI: 10.1177/0278364913514466.

Zug, Sebastian et al. "Optimized configuration of a tactile sensor system for flexible grippers." 22nd IEEE International Conference on Emerging Technologies and Factory Automation, Limassol, Cyprus, IEEE, Sep. 12, 2017 (Sep. 12, 2017), pp. 1-4, DOI: 10.1109/ETFA.2017.8247763.

Zapciu, Aurelian et al. "Additive manufacturing integration of thermoplastic conductive materials in intelligent robotic end effector systems." ResearchGate, Dec. 2016, https://www.researchgate.net/figure/3D-printed-adaptive-finger-with-integrated-bending-sensor-1-adaptive-finger-2_fig8_311534441.

Elgeneidy, Khaled et al. "Bending angle prediction and control of soft pneumatic actuators with embedded flex sensors—A data-driven approach." Elsevier Ltd., 2017, https://www.sciencedirect.com/science/article/pii/S0957415817301496#fig0004.

Kappassov, Zhanat et al. "Tactile sensing in dexterous robot hands—Review." Robotics and Autonomous Systems. Elsevier, 2015. Web. http://www.isir.upmc.fr/files/2015ACLI3684.pdf.

Gong, Daoxiong et al. "A Pneumatic Tactile Sensor for Co-Operative Robots." Sensors (Basel, Switzerland), Nov. 10, 2017. Web. https://pdfs.semanticscholar.org/487c/9e82153de3ec07919d73f55aaa4efaa24f4e.pdf.

Kuppuswamy, et al., "Fast Model-Based Contact Patch And Pose Estimation For Highly Deformable Dense-Geometry Tactile Sensors", MIT paper, URL: http://groups.csail.mit.edu/robotics-center/public_papers/Kuppuswamy20.pdf, Published Sep. 19, 2019.

Multiscale stress-strain characterization of onion outer epidermal tissue in wet and dry states (https://www.researchgate.net/figure/Force-sensor-calibration-A-The-force-sensor-was-calibrated-using-a-precision-balance_fig2_270965335). Jan. 2015.

Long Xianchao "Tactile-Based Mobile Robot Navigation" May 30, 2013 (May 30, 2013), XP055818996, Retrieved from the Internet: URL:https://web.wpi.edu/Pubs/ETD/Available/etd-061313-134710/unrestricted/xlong. pdf [retrieved on Jun. 29, 2021], 73 pages.

Yussof H et al: "Application of Contact-Based Sensors for Self-Localization and Object Recognition in Humanoid Robot Navigation Tasks", Robot and Human Interactive Communication, 2007. RO-MAN 2007. The 16th IEEE International Symposium On, IEEE, PI, Aug. 26, 2007 (Aug. 26, 2007), pp. 188-193, XP031224912, ISBN: 978-1-4244-1634-9, 6 pages.

Extended European Search Report for Application No. 21157621.0-1202, date Jul. 12, 2021, 8 pages.

Extended European Search Report for Application No. 21157677.2-1202, dated Aug. 5, 2021, 5 pages.

Claudius Strub T., Florentin Worgottert, Helge Ritter and Yulia Sandamirskaya: Correcting pose estimates during tactile exploration of object shape: a neuro-robotic study, 4th International Conference on Development and Learning and on Epigenetic Robotics, IEEE, Oct. 13, 2014 (Oct. 13, 2014), pp. 26-33, XP032702771, DOI: 10.1109/DEVLRN.2014.6982950, 8 pages.

Rui Li, Robert Platt Jr., Wenzhen Yuan, Andreas Ten Pas, Nathan Roscup, Mandayam A. Srinivasan, and Edward Adelson: Localization and manipulation of small parts using GelSight tactile sensing, 2014 IEEE/RSJ International Conference on Intelligent Robots and Systems, IEEE, Sep. 14, 2014 (Sep. 14, 2014), pp. 3988-3993, XP032676947, DOI: 10.1109/IROS.2014.6943123, 6 pages.

Direction of slip detection for adaptive grasp force control with a dexterous robotic hand (https://www.syntouchinc.com/wpcontent/uploads/2018/09/Direction-of-Slip-Detection-for-Adaptive-Grasp-Force-Control-with-aDexterous-Robotic-Hand.pdf), Proceedings of the 2018 IEEE/ASME International, Conference on Advanced Intelligent Mechatronics (AIM), Auckland, New Zealand, Jul. 9-12, 2018, 7 pages.

The bubble technique: interacting with large virtual environments using haptic devices with limited workspace (https:// www.researchgate.net/publication/4131411_The_Bubble_technique_interacting_with_large_virtual_environments_using_haptic_devices_with_limited_workspace), Apr. 1, 2005.

* cited by examiner

SYSTEMS AND METHODS FOR CALIBRATING DEFORMABLE SENSORS

TECHNICAL FIELD

Embodiments described herein generally relate to deformable sensors and, more particularly, to systems and methods for calibrating deformable sensors.

BACKGROUND

Deformable sensors are sensors that comprise a deformable membrane that define an enclosure that is filled with a medium. An internal sensor is disposed within the enclosure and has a field of view of a bottom surface of the deformable membrane. The sensor can detect when an object is pressed against the deformable membrane and such that the deformable membrane deforms toward the internal sensor. However, the working distance between the internal sensor and the bottom surface of the deformable membrane is very small. Such sensors, such as time-of-flight sensors, are not equipped to work with these short working distances. If a deformable membrane is inflated too much or too little, or does not have the correct shape, errors may be generated by the internal sensor.

Thus alternative systems and methods for calibrating deformable sensors may be desired.

SUMMARY

In one embodiment, a method of calibrating a deformable sensor includes capturing image data of the deformable sensor using an external image sensor, wherein the deformable sensor comprises a deformable membrane defining an enclosure that is configured to be filled with a medium. The method further includes comparing the image data of the deformable sensor to a metric. When the image data does not satisfy the metric, the method includes adjusting a pressure within the enclosure.

In another embodiment, a system includes a deformable sensor having a deformable membrane defining an enclosure that is configured to be filled with a medium, an external image sensor external to the deformable sensor, a processor, and a non-transitory computer readable medium storing instructions. When the processor executes the instructions, the processor is controlled to capture image data of the deformable sensor using the external image sensor, compare the image data of the deformable sensor to a metric, and, when the image data does not satisfy the metric, adjust a pressure within the enclosure.

In yet another embodiment, a method of controlling a robot includes controlling the robot to position a deformable sensor associated with the robot within a field of view of at least one an external image sensor, receiving, from the external image sensor, image data of the deformable sensor, and comparing the image data of the deformable sensor to a metric. When the image data does not satisfy the metric, the method further includes adjusting a pressure within the enclosure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
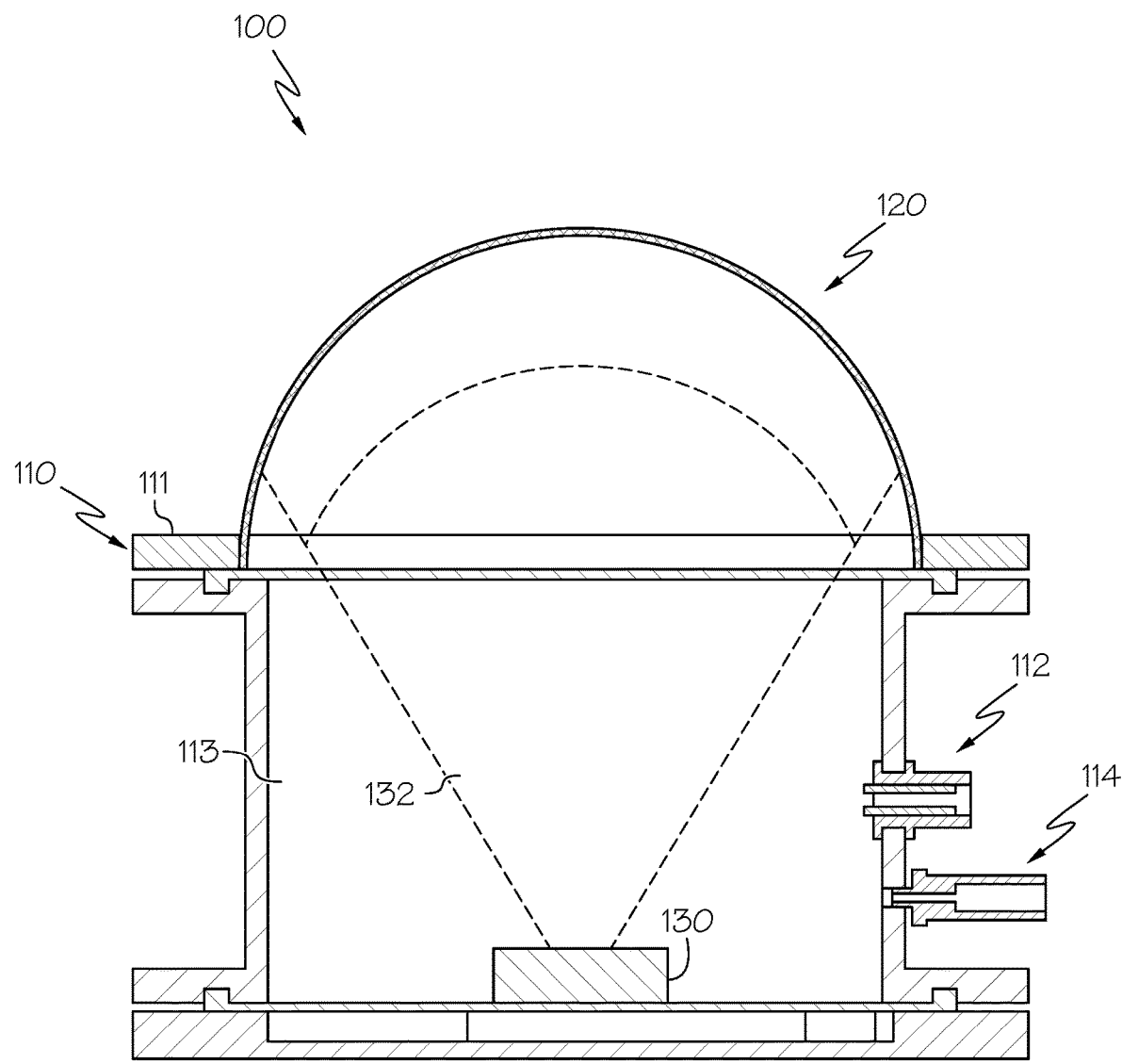
FIG. 1 schematically depicts a cross-sectional elevation view of an example deformable sensor according to one or more embodiments described and illustrated herein.

As humans, our sense of touch allows us to determine the shape of an object without looking at the object. Further, our sense of touch provides information as to how to properly grasp and hold an object. Our fingers are more sensitive to touch than other parts of the body, such as arms. This is because we manipulate objects with our hands.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Further, in some applications, a deformable/compliant end effector may be desirable. For example, a deformable end effector may be desirable in robot-human interactions. Further, a deformable/compliant end effector may be desirable when the robot manipulates fragile objects.

Embodiments of the present disclosure are directed to deformable/compliant contact and/or geometry sensors (hereinafter "deformable sensors") that not only detect contact with a target object, but also detect the geometry, pose and contact force of the target object. Particularly, the deformable sensors described herein comprise a deformable membrane coupled to a housing that maintains a sensor capable of detecting displacement of the deformable membrane by contact with an object. The deformable sensors described herein not only detect the pressure or force that is applied to the deformable membrane, but can also detect the geometry and pose of the object. Thus, the deformable sensors described herein provide a robot (or other device) with a sense of touch when manipulating objects.

The size and shape of the deformable sensor should be calibrated so that the object type, object geometry, and/or object pose of an object may be accurately detected. However, the working distance between an internal sensor and bottom surface of the deformable membrane of the deformable sensor may be very short. The short working distance can create difficulties in obtaining accurate measurements for object and pose detection. Very small deviations from the proper size and/or shape of the deformable membrane can cause significant errors. Embodiments of the present disclosure provide systems and methods for properly calibrating deformable sensors for accurate readings and advanced functionalities such as object and/or object pose detection.

In embodiments, one or more external image sensors are used to generate image data of a deformable sensor that is compared against a metric. When the image data does not satisfy the metric, the pressure within the deformable sensor is adjusted until the image data satisfies the metric. In this manner, the deformable sensor has an accurate size and/or shape, which leads to more accurate detections of the type of an object and/or a pose of an object.

Figure 2:
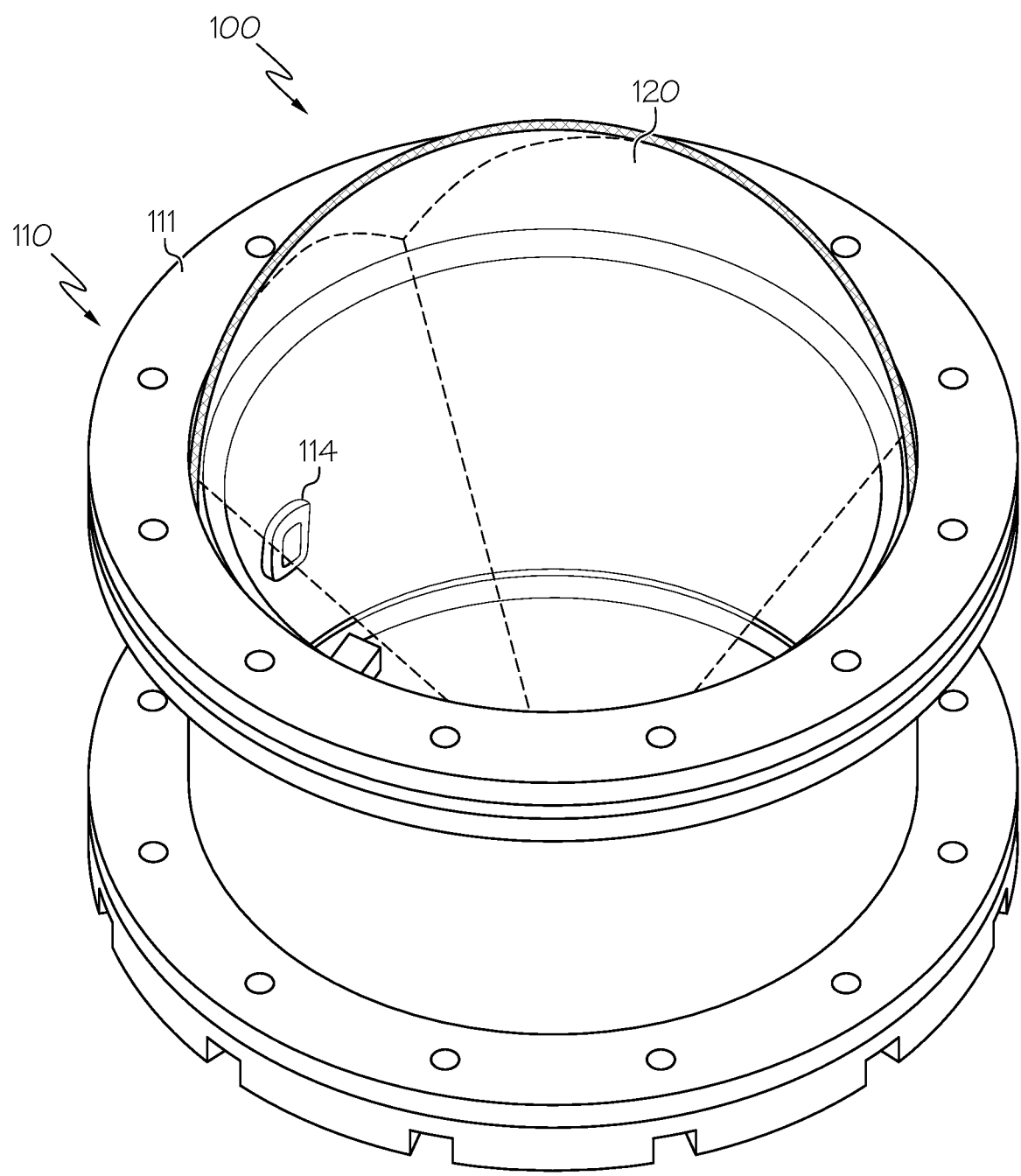
FIG. 2 schematically depicts a top perspective view of the example deformable sensor depicted by FIG. 1 according to one or more embodiments described and illustrated herein.

Referring now to FIGS. 1 and 2, an example deformable sensor 100 is schematically illustrated. FIG. 1 is a front elevation view of the example deformable sensor 100 and FIG. 2 is a top perspective view of the example deformable sensor 100. FIGS. 1 and 2 depict differing embodiments. The example deformable sensor 100 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1, although any suitable shape may be utilized in other embodiments. In another example, the medium is a gel, such as silicone or other rubber-like substance. In various embodiments, the medium may be anything that is transparent to an internal sensor (discussed in more detail below), such as to a wavelength of a time of flight sensor. The medium may include clear/transparent rubbers in other embodiments. In other embodiments the medium may be a liquid. In some examples, the deformable membrane 120 and the medium within the enclosure 113 may be fabricated of the same material, such as, without limitation, silicone. In some embodiments the deformable sensor 100 may be mountable. For example, the enclosure 113 may include brackets to be mounted on any suitable object (such as a robot) or material. The deformable membrane 120 may be a latex or any other suitable material, such as a suitably thin, non-porous, rubber-like material.

The touch sensitivity of the deformable sensor 100 may be tuned/modified by changing the material of the deformable membrane 120 and/or the pressure within the enclosure 113. By using a softer material (e.g., soft silicone), the deformable sensor 100 may be more sensitive because it is more easily deformed. Similarly, lowering the pressure within the enclosure 113 may also cause the deformable membrane 120 to more easily deform, which may in turn provide for a more sensitive deformable sensor 100.

Figure 3:
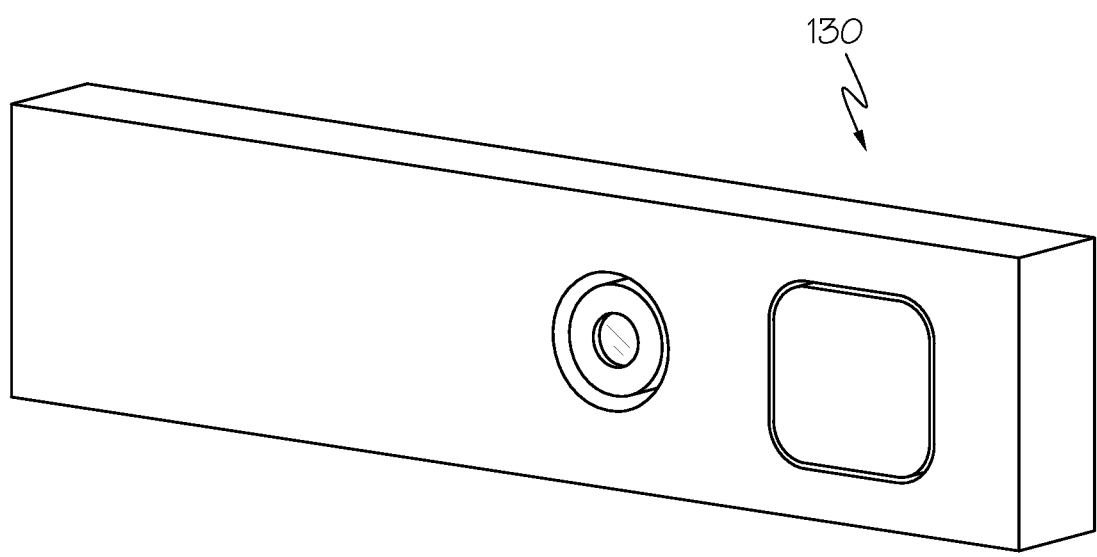
FIG. 3 schematically depicts an example time-of-flight sensor for use in a deformable sensor according to one or more embodiments described and illustrated herein.

An internal sensor 130 capable of sensing depth may be disposed within the enclosure 113. The internal sensor 130 may have a field of view 132 directed through the medium and toward a bottom surface of the deformable membrane 120. In some embodiments the internal sensor 130 may be an optical sensor. As described in more detail below, the internal sensor 130 may be capable of detecting deflections of the deformable membrane 120 when the deformable membrane 120 comes into contact with an object. In one example, the internal sensor 130 is a time-of-flight sensor capable of measuring depth (i.e., a depth sensor). The time-of-flight sensor emits an optical signal (e.g., an infrared signal) and has individual detectors (i.e., "pixels") that detect how long it takes for the reflected signal to return to the sensor. The time-of-flight sensor may have any desired resolution. The greater the number of pixels, the greater the resolution. The resolution of the sensor disposed within the internal sensor 130 may be changed. In some cases, low resolution (e.g., one "pixel" that simply detects displacement) may be desired. In others, a sensitive time-of-flight sensor such may be used as a high resolution internal sensor 130 that provides dense tactile sensing. Thus, the internal sensor 130 may be modular because the sensors may be changed depending on the application. FIG. 3 depicts an example time-of-flight sensor. A non-limiting example of a time-of-flight sensor is the Pico Flexx sold by PMD Technologies AG of Siegen, Germany. Other types of visual internal sensors include, by way of non-limiting example, stereo cameras, laser range sensors, structured light sensors/3D scanners, single cameras (such as with dots or other patterns inside), or any other suitable type of visual detector. For example, the internal sensor 130 may be configured as a stereo-camera capable of detecting deflections of the deformable membrane 120 by an object.

In some embodiments the touch sensitivity of a deformable sensor 100 may be determined as a function of the resolution of the internal sensors within the deformable sensor 100. For example, the resolution of a deformable sensor 100 may be increased due to an increase in the resolution of an internal sensor 130 and/or the quantity of internal sensors 130. For example, a decrease in the number of internal sensors 130 within a deformable sensor 100 can be compensated for by a corresponding increase in the resolution of at least some of the remaining internal sensors 130. As discussed in more detail below, the aggregate deformation resolution may be measured as a function of the deformation resolution or touch sensitivity among the deformable sensors 100 in a portion of a robot. In some embodiments aggregate deformation resolution may be based upon a quantity of deformable sensors in a portion of the robot and a deformation resolution obtained from each deformable sensor in that portion.

Referring again to FIG. 1, a conduit 114 may be utilized in the enclosure 113 to provide power and/or data/signals, such as to the internal sensor 130 by way of an conduit, such as for USB (universal serial bus) or any other suitable type of power and/or signal/data connection. As used herein, an airtight conduit may include any type of passageway through which air or any other fluid (such as liquid) cannot pass. In this example, an airtight conduit may provide a passageway through which solid object (such as wires/cables) may pass through by with an airtight seal being formed around such wires/cables at each end of the airtight conduit. Other embodiments utilized wireless internal sensors 130 to transmit and/or receive data and/or power. In various embodiments where the medium is not a gas, such as silicone, the enclosure 113 and/or conduit 114 may not necessarily be airtight.

In some embodiments the internal sensor 130 may be an internal pressure sensor (barometer, pressure sensor, etc.) utilized to detect the general deformation of the deformable membrane 120 through the medium. In some embodiments the deformable sensor 100 and/or internal sensor 130 may receive various data, such as through the conduit 114 discussed above, wireless data transmission (Wi-Fi, Bluetooth, etc.), or any other suitable data communication protocol. For example, pressure within a deformable sensor 100 may be specified by a pressurization parameter and may be inversely proportional to the touch sensitivity of the deformable sensor 100. In some embodiments the touch sensitivity of a deformable sensor 100 may be modified by changing pressure within the enclosure 113 or a material of the deformable membrane 120. In some embodiments receipt of an updated parameter value may result in a real-time or delayed update (pressurization, etc.).

Figure 4:
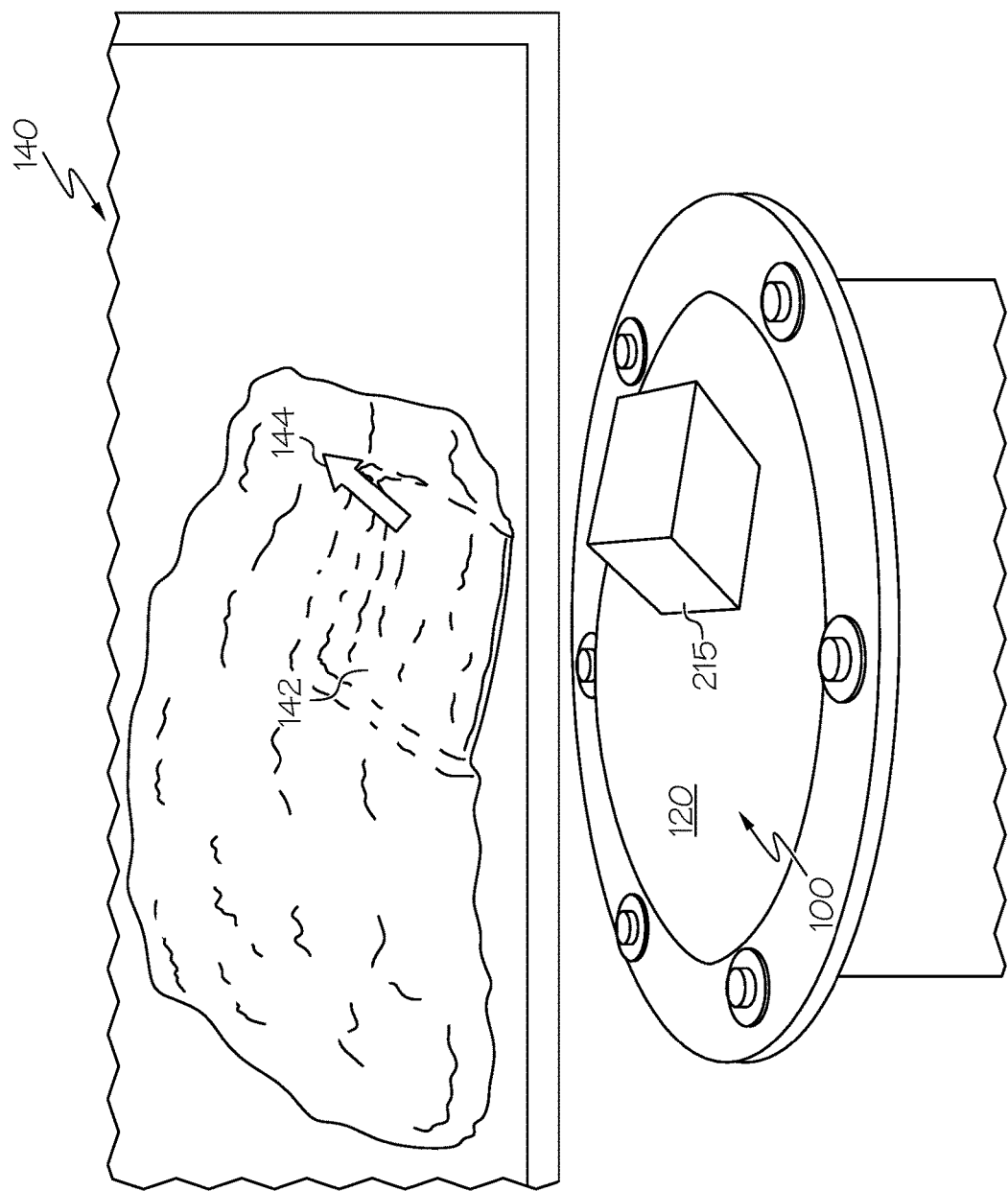
FIG. 4 is an image depicting an output of a deformable sensor on an electronic display according to one or more embodiments described and illustrated herein.

FIG. 4 depicts an image of an example object 215 displacing the deformable membrane 120 of the example deformable sensor 100. In the illustrated embodiment, a display device 140 outputs for display on a device, output of the deformable sensor 100 in real time as an object 215 contacts and/or deforms the deformable membrane 120. It should be understood that the display device 140 is provided for illustrative purposes only, and that embodiments may be utilized without a display device. As the object 215 is pressed into the deformable membrane 120, the object 215 imparts its shape into the deformable membrane 120 such that the deformable membrane 120 conforms to the shape of the object 215. The resolution of the internal sensor 130 may be such that the internal sensor 130 detects the geometry and/or pose of the displaced deformable membrane 120. For example, when the internal sensor 130 is a time-of-flight sensor, the optical signal that is reflected off of the bottom surface of the deformable membrane 120 that is being deflected by the object has a shorter time-of-flight than the optical signal that is reflected by the deformable membrane 120 at a region outside of the deflected region. Thus, a deformation region 142 (or displaced region, used herein interchangeably) having a geometry and/or pose matching the shape of the object 215 may be outputted and displayed on the display device 140.

The deformable sensor 100 therefore not only may detect the presence of contact with the object 215, but also the geometry of the object 215. In this manner, a robot equipped with a deformable sensor 100 may determine the geometry of an object based on contact with the object.

Additionally, a geometry and/or pose of the object 215 may also be determined based on the geometric information sensed by the deformable sensor 100. For example, a vector 144 that is normal to a surface in the deformation region 142 may be displayed, such as when determining the pose of the object 215. The vector 144 may be used by a robot or other device to determine which direction a particular object 215 may be oriented, for example.

Figure 5:
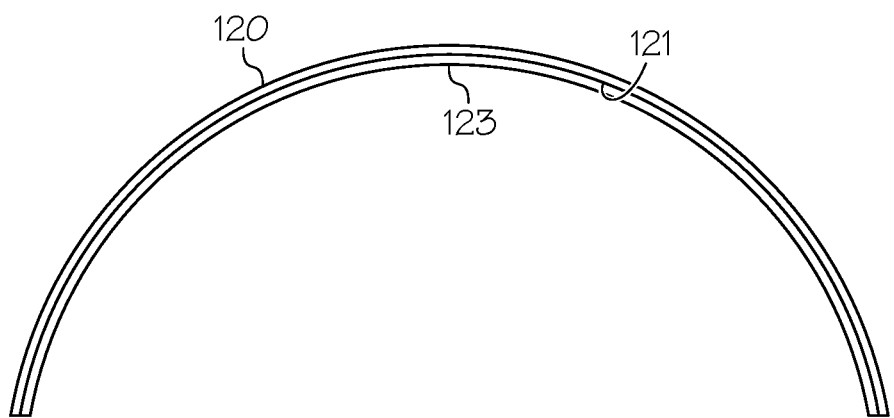
FIG. 5 schematically depicts a filter layer coupled to a deformable membrane of a deformable sensor according to one or more embodiments described and illustrated herein.

Referring now to FIG. 5, in some embodiments an optional filter layer 123 may be disposed on a bottom surface 121 of the deformable membrane 120. As described in more detail below and shown in FIG. 7, the bottom surface 121 of the deformable membrane 120 may be patterned (e.g., a grid pattern 122, a dot pattern, or any other suitable type pattern) that may be detected, by way of non-limiting example, a stereo-camera to detect displacement. The filter layer 123 may be configured to aid the internal sensor 130 in detecting deformation of the deformable membrane 120. In some embodiments, the filter layer 123 reduces glare or improper reflections of one or more optical signals emitted by the internal sensor 130. In some embodiments the filter layer 123 may scatter one or more optical signals emitted by the internal sensor 130. The filter layer 123 may be an additional layer secured to the bottom surface 121 of the deformable membrane 120, or it may be a coating and/or pattern applied to the bottom surface 121 of the deformable membrane 120.

Figure 6:
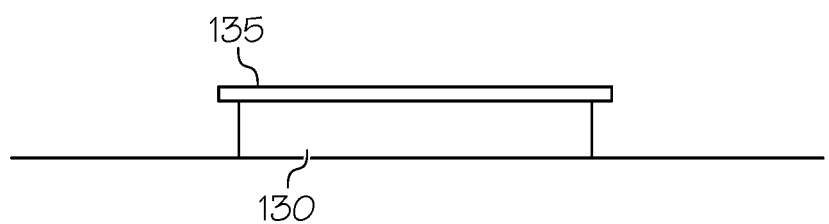
FIG. 6 schematically depicts a filter within a field of view of a sensor of a deformable sensor according to one or more embodiments described and illustrated herein.

Referring to FIG. 6, in some embodiments an internal sensor filter 135 may be disposed within the field of view 132 of the internal sensor 130. The internal sensor filter 135 may optimize the optical signal emitted by the internal sensor 130 for reflection upon the bottom surface 121 of the deformable membrane 120. Like the filter layer 123, the internal sensor filter 135 may be disposed within a field of view 132 of the internal sensor 130 and may reduce glare or improper reflections of any optical signals emitted by the internal sensor 130. In some embodiments the internal sensor filter 135 may scatter one or more optical signals emitted by the internal sensor 130. In some embodiments, both the internal sensor filter 135 and the filter layer 123 may be utilized.

Figure 7:
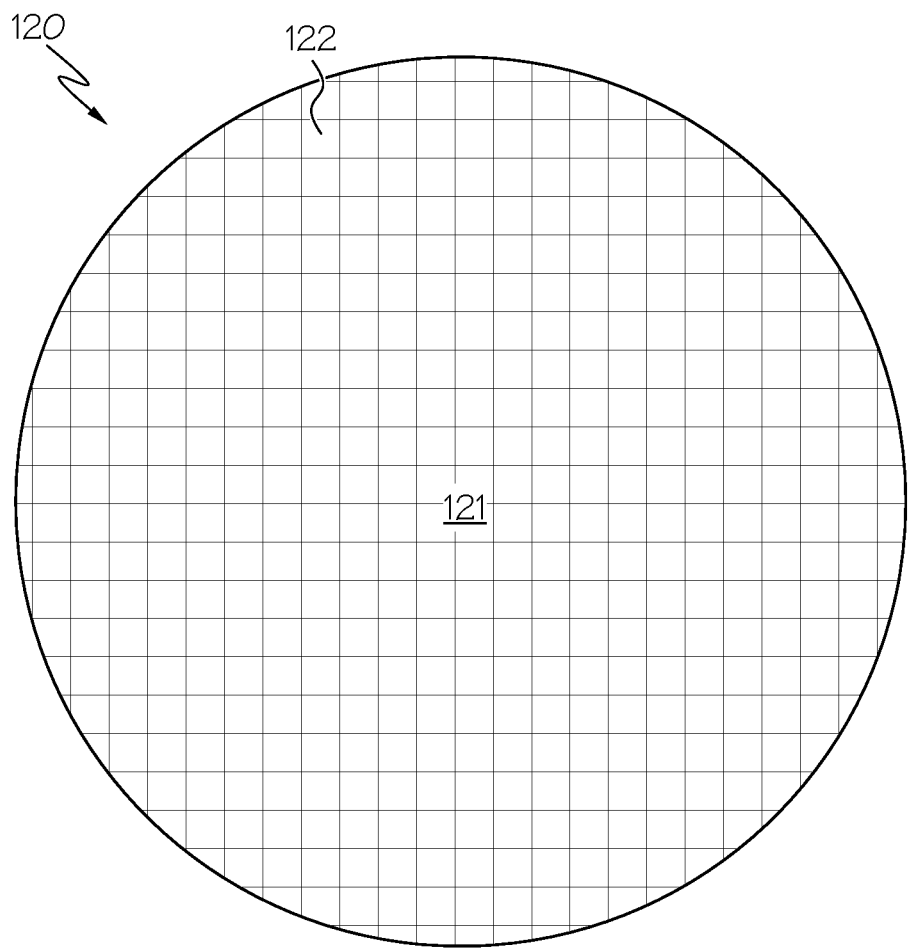
FIG. 7 schematically depicts a pattern on a bottom surface of a deformable membrane of a deformable sensor according to one or more embodiments described and illustrated herein.

Referring now to FIG. 7, a grid pattern 122 may be applied to a bottom surface 121 of the deformable membrane 120 to assist in the detection of the deformation of the deformable membrane 120. For example, the grid pattern 122 may assist in the detection of the deformation when the internal sensor 130 is a stereo-camera. For example, varying degrees of distortion to the grid pattern 122 may be utilized to discern how much deformation has occurred. In this example, the distance between parallel lines and/or measuring curvature of lines in the grid pattern 122 may be used to determine the amount of deformation at each point in the grid. It should be understood that embodiments are not limited to grid patterns, as other types of patterns are possible, such as dots, shapes, and the like. The pattern on the bottom surface 121 may be random, and not necessarily arranged in a grid pattern 122 or an array as shown in FIG. 7.

Figure 8:
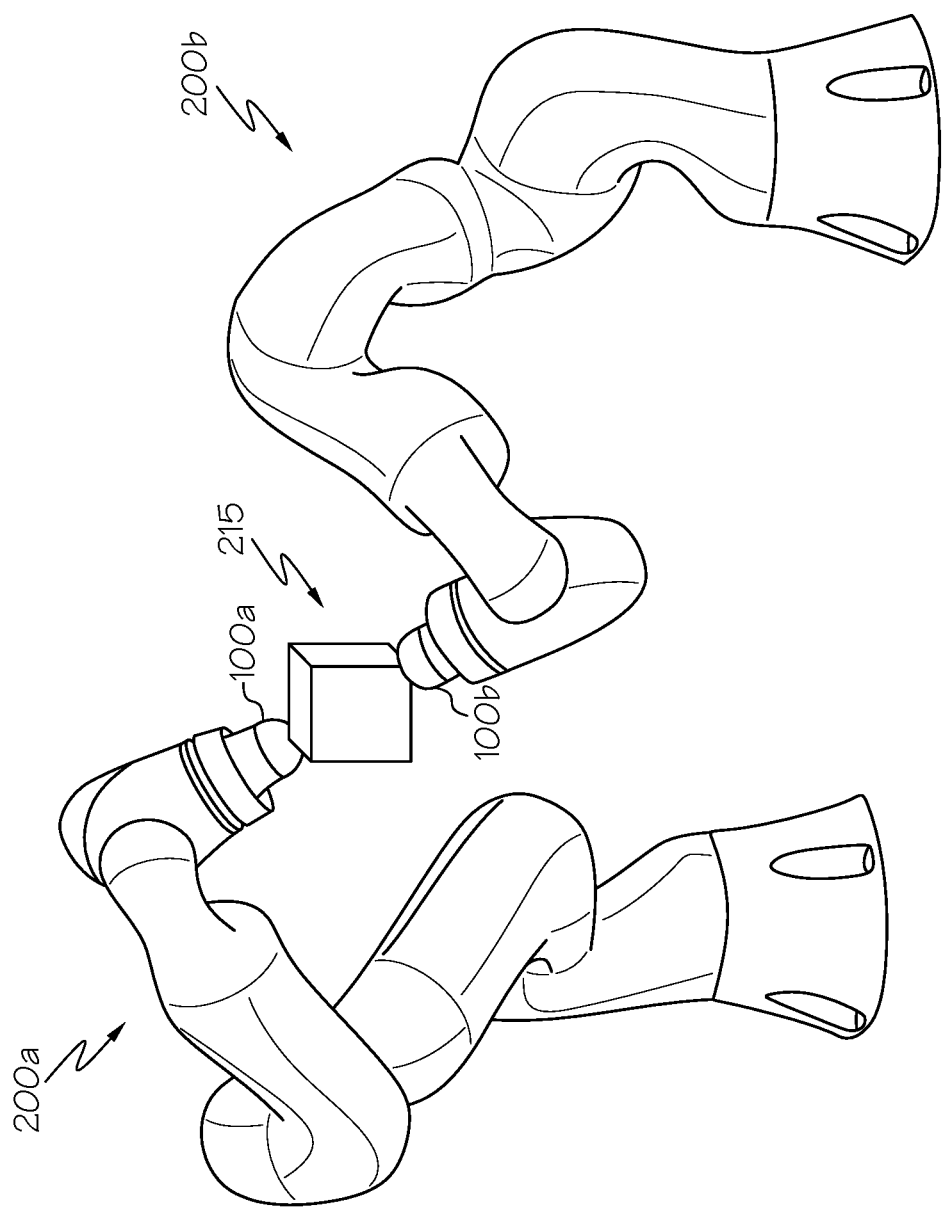
FIG. 8 schematically depicts two example robots each having a deformable sensor and manipulating an object according to one or more embodiments described and illustrated herein.

FIG. 8 schematically depicts an example non-limiting first robot 200a having a first deformable sensor 100a and an example second robot 200b having a second deformable sensor 100b. In this illustrated example, the first robot 200a and the second robot 200b may cooperate for dual arm manipulation wherein both the first deformable sensor 100a and the second deformable sensor 100b contact the object 215. As stated above, the deformable sensors 100 described herein may be used as an end effector of a robot to manipulate an object. The deformable sensor 100a, 100b may allow a robot to handle an object 215 that is fragile due to the flexible nature of the deformable membrane 120. Further, the deformable sensor 100 may be useful for robot-to-human contact because in some embodiments the deformable membrane 120 may be flexible rather than rigid to the touch.

In addition to geometry and pose estimation, the deformable sensor 100a, 100b may be used to determine how much force a robot 200a (or other device) is exerting on the target object 215. Although reference is made to first robot 200a, any such references may in some embodiments utilize second robot 200b, any other suitable devices, and/or any combinations thereof. This information may be used by the robot 200a to more accurately grasp objects 215. For example, the displacement of the deformable membrane 120 may be modeled. The model of the displacement of the deformable membrane 120 may be used to determine how much force is being applied to the target object 215. The determined force as measured by the displacement of the deformable membrane 120 may then be used to control a robot 200a to more accurately grasp objects 215. As an example, the amount of force a robot 200a (discussed in more detail below) applies to a fragile object 215 may be of importance so that the robot 200a does not break the object 215, which may be fragile. In some embodiments an object 215 may be assigned a fragility value, where the robot 200a may programmed to interact with all objects 215 based upon the fragility value (which may be received at a processor, for example, from a database, server, user input, etc.). In some embodiments a user interface may be provided to specify any suitable value (pressure within the deformable sensor 100 FIG. 1, fragility value pertaining to an object 215, etc.) for initialization and/or updating (such as on a display device depicted in 140 FIG. 4). In other embodiments a robot 200a may be able to identify specific objects 215 (such as via object recognition in a vision system, etc.) whereby the fragility value may be modified, which may lead to utilization of another deformable sensor having a more suitable touch sensitivity, aggregate deformation resolution, pressure, and/or material for the deformable membrane 120. In some embodiments a processor in a robot 200a may from the internal sensor 130 receive data representing the deformation region 142. In various embodiments a processor in a robot 200a may determine a vector 144 normal to a surface of the object 215 based on the data representing the deformation region 142 and utilize the vector 144 to determine which direction the object 215 is oriented.

In embodiments, a plurality of deformable sensors may be provided at various locations on a robot. A deformable sensor may act as an end effector of the robot, and have a high deformation resolution and/or touch sensitivity. As used herein, "resolution" may refer, for example, to how many pixels a deformable sensor has. The number of pixels may range from 1 (e.g., a sensor that simply detects contact with a target object) to thousands or millions (e.g., a dense sensor provided by a time-of-flight sensor having thousands of pixels) or any suitable number. Touch sensitivity may refer to how easily the deformable membrane deforms when contacting a target object. The more easily the deformable membrane deforms, the more sensitive the sensor may be. A deformable sensor may be of a high deformation resolution, with a dense tactile sensing sensor that is provided as an end effector of a robot, thereby giving the robot a fine sense of touch like a human's fingers. In other embodiments the touch sensitivity of a deformable sensor may a function of some combination of the resolution of the internal sensors within the deformable sensor, the material of the deformable membrane, and the internal pressure within the deformable sensor. In some embodiments a deformable sensor may have a clamp or other suitable attachment mechanism. For example, the deformable sensor may be removably attached to a robot, and/or a robot which may have features to provide for attachment and/or removal of a deformable sensor. Any suitable type of clamp, fastener, or attachment mechanism may be utilized in some embodiments.

Each deformable sensor may have a desired deformation resolution and/or a desired touch sensitivity depending on its location on the robot. In some embodiments, deformable sensors are disposed on the arms of a robot. For example, the deformable sensors may be shaped to conform to the shape of the arms. It is noted that the deformable sensors described herein may take on any shape depending on the application. Deformable sensors may be very flexible and thus sensitive. This may be beneficial in human-robot interactions. In this way, the robot may contact a person (e.g., to give the person a "hug") without causing harm due to the softness of the deformable sensors. The deformation resolution of one or more deformation sensors in the arms may be high or low depending on the application.

As discussed above, a portion of a robot may provide an aggregate deformation resolution that is greater than another portion. In some embodiments, as illustrated by FIG. 8, a portion of a first robot 200a may interact with an object 215 in simultaneous coordination with a portion of second robot 200b, and the aggregate deformation resolution of the portion of the first robot 200a may equal the aggregate deformation resolution of the portion of the second robot 200b. In some embodiments touch sensitivity, such as in a portion of a robot 200a, may be determined and/or modified based upon a fragility value of one or more objects 215 with which the portion interacts. In various embodiments the touch sensitivity of the portion may differ from the touch sensitivity of another portion based upon both portions being configured to interact with a plurality of objects 215 having differing fragility values. In some embodiments modifying the aggregate deformation resolution of the portion may be based upon adjusting a quantity of deformable membranes 120, a quantity of internal sensors 130 within one or more deformable membranes 120, and/or a deformation resolution of at least one internal sensor 130.

Figure 9:
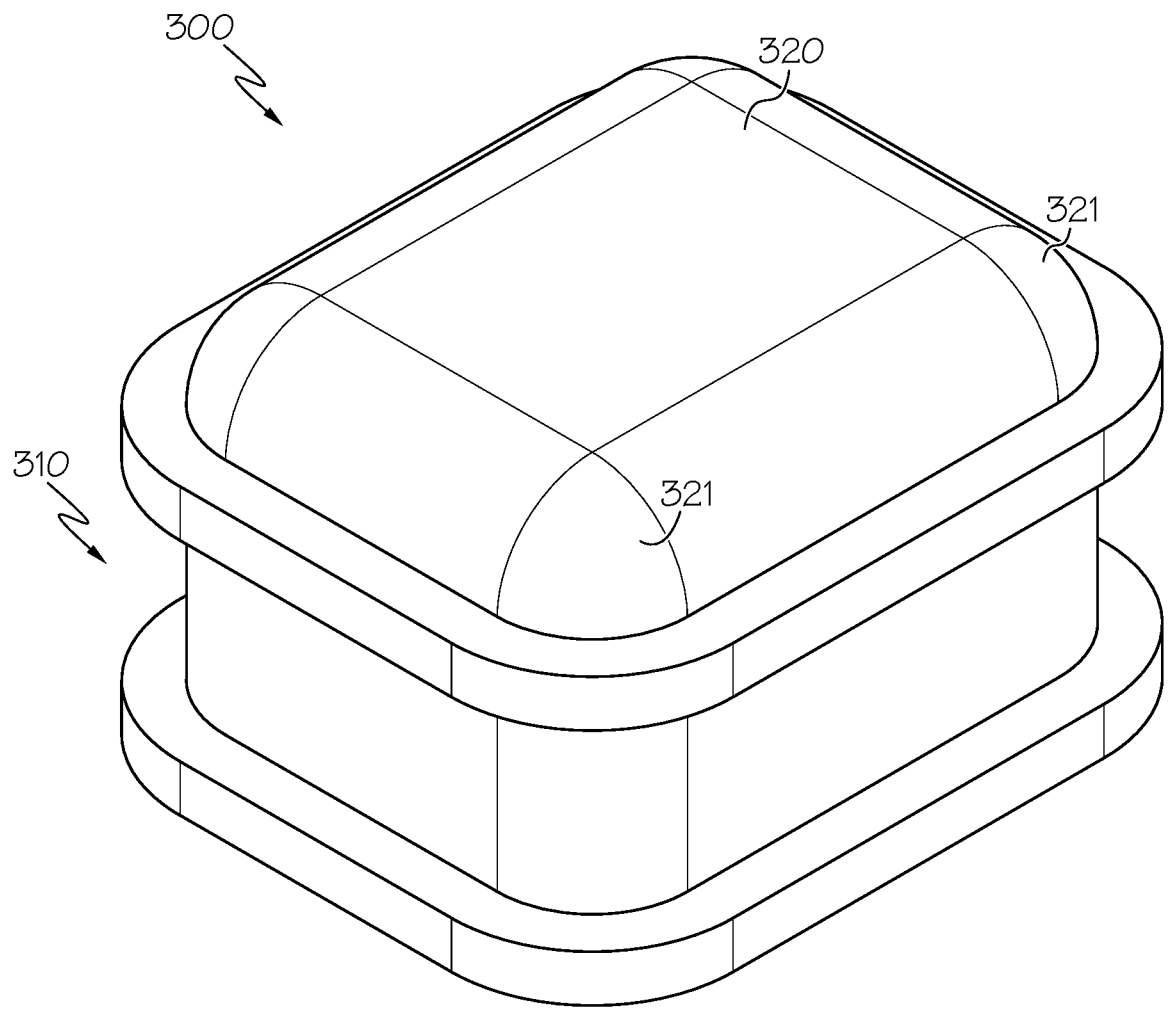
FIG. 9 schematically depicts another example deformable sensor according to one or more embodiments described and illustrated herein.

Embodiments are not limited to the dome-shaped deformable sensor 100 illustrated in FIGS. 1 and 2. The deformable sensors described herein may take on any shape. FIG. 9 illustrates deformable sensor 300 with a deformable membrane 320 attached to a base 310 wherein the deformable membrane 320 has corners 321 to give it a rectangle-like shape when inflated.

Because of the short working distances between the internal sensor 130 and the bottom surface of the deformable membrane 120, the pressure within the enclosure 113 should be calibrated such that the deformable membrane 120 takes on a known shape and size. Small variations in shape and size of the deformable membrane 120 may cause errors in the measurements provided by the deformable sensor 100. Such errors may cause undesirable results, such as incorrectly detecting a type of object, inability to detect a type of object, incorrectly detecting a pose of an object, inability to detect a pose of an object, incorrectly detecting a geometry of an object, inability to detect a geometry of an object, and the like. Thus, it is desirable to adjust the pressure within the enclosure so that the deformable sensor 100 is within a threshold size and/or shape.

Other factors may contribute to the deformable sensor 100 not having a desirable shape. As a non-limiting example, variations in elasticity of the deformable membrane in different production batches may cause the shape and/or size of two deformable sensors 100 to be different even though they have the same pressure within the enclosure 113. Thus, pressure alone may not be sufficient enough to calibrate the deformable sensor 100.

Figure 10A:
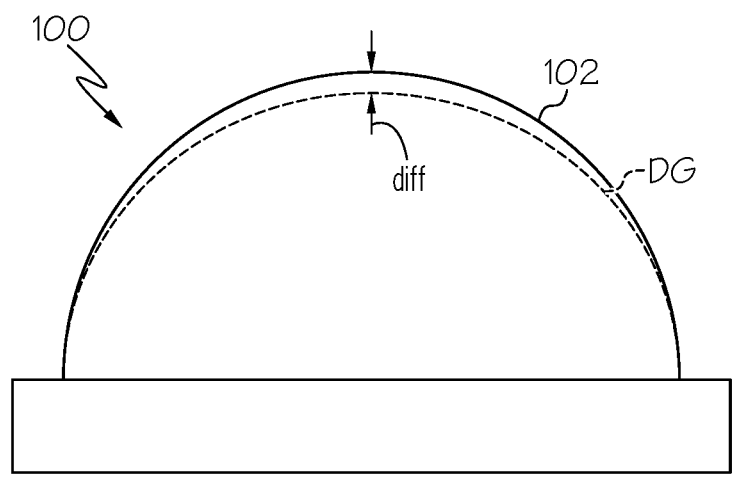
FIGS. 10A-10C schematically depict example deformable sensors that are not properly calibrated according to one or more embodiments described and illustrated herein.
Figure 10B:
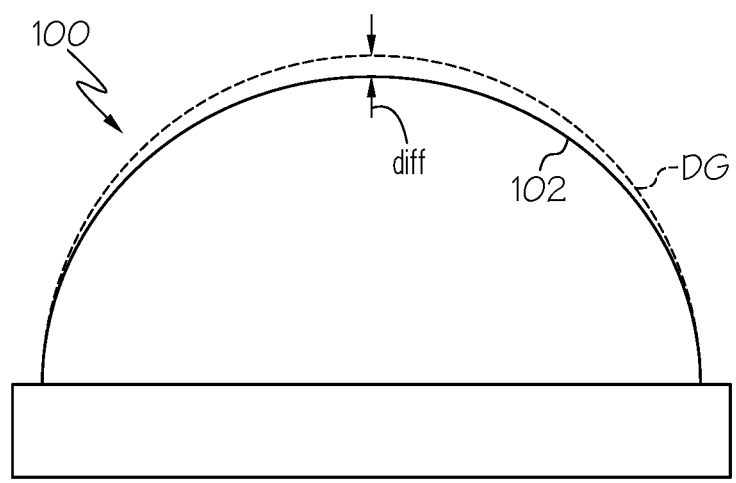
Figure 10C:
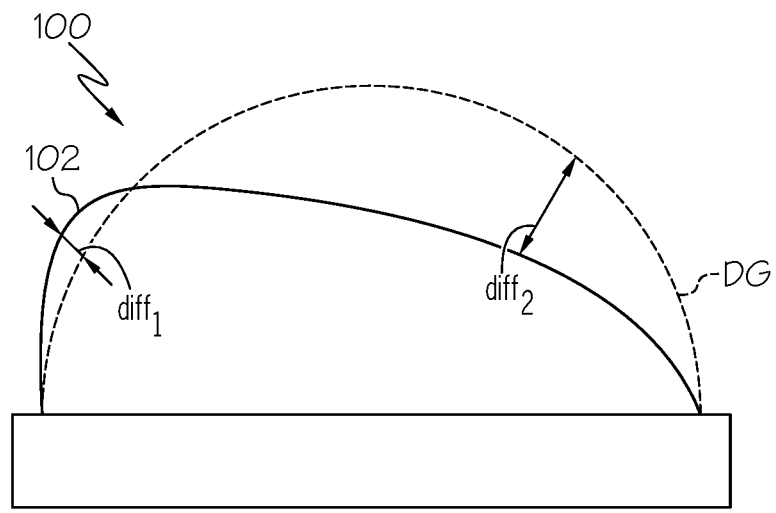

Referring now to FIG. 10A, a deformable membrane 102 of a deformable sensor 100 is overly inflated and thus is larger than a desired geometry DG. It this situation, signals from the internal sensor will take longer to return, thereby causing errors in the data produced by the internal sensor. FIG. 10B illustrates the opposite case, where the deformable membrane 102 is under inflated and is thus smaller than the desired geometry DG. FIG. 10C illustrates an example wherein the deformable membrane is neither over inflated nor under inflated. However, the deformable membrane 102 is warped and therefore does not have the desired geometry DG. For example, the deformable membrane 102 stretches more to the left than to the right. This may cause errors in the signals produced by the internal sensor.

Figure 11:
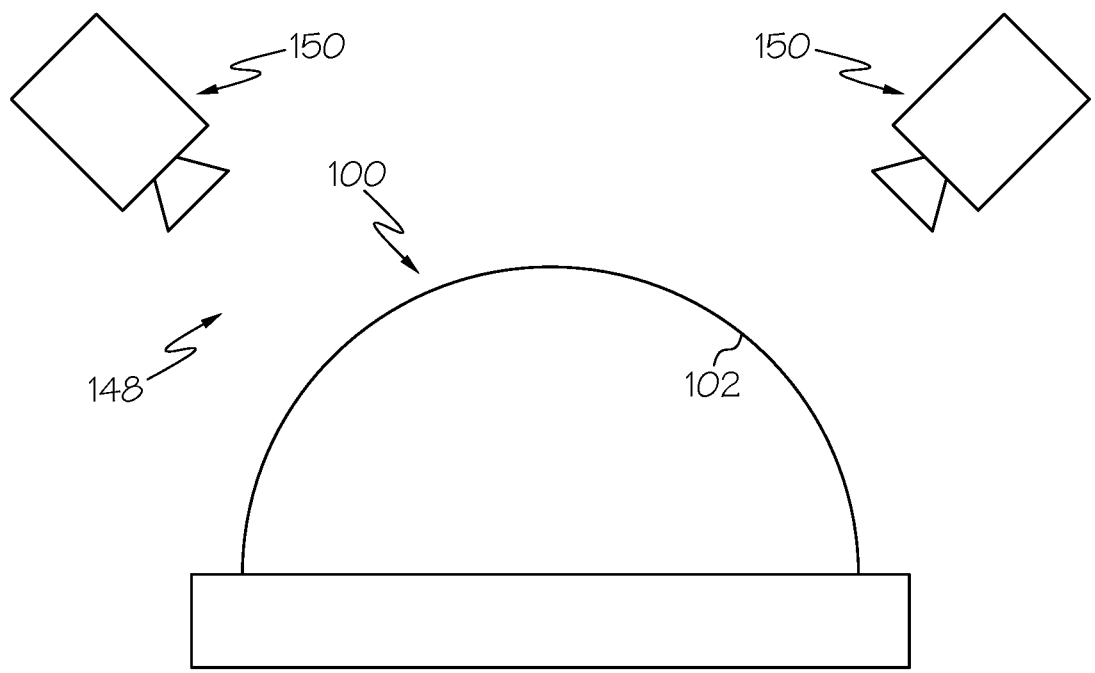
FIG. 11 schematically depicts an example system for calibrating a deformable sensor according to one or more embodiments described and illustrated herein.

Embodiments of the present disclosure are directed to a system for calibrating the shape and/or size of a deformable sensor 100. Referring to FIG. 11, the system 148 includes a deformable sensor 100 and at least one external image sensor 150 having a field of view of the deformable sensor 100. In the illustrated embodiment there are two external image sensors 150; however, any number of external image sensors 150 may be provided. When more than one external image sensor 150 is utilized, different views of the deformable membrane 102 may be generated. Thus, a 360° image of the deformable membrane may be obtained. However it should be understood that only one external image sensor 150 may be utilized.

The external image sensors 150 are external from the deformable sensor 100, and may be any type of sensor capable of producing image data of an external surface of the deformable membrane 102. For example, the external image sensor 150 may be an RGB camera, such as a CCD camera. As another example, the external image sensor 150 may be a depth camera, such as an infrared-based depth camera. As a further non-limiting example, the external image sensor 150 may be an RGB-D camera.

The one or more external image sensors 150 are capable of detecting a size and/or shape of the deformable sensor 100. As a non-limiting example, signals produced by the one or more external image sensors 150 may be provided to an external computing device (not shown) for image processing. In other embodiments, the one or more external image sensors 150 may they themselves perform image processing functions.

The data from the one or more external image sensors 150 is used to generate images of shape of the deformable membrane 102. As a non-limiting example, an image processing algorithm may be used to detect the size and/or shape of the deformable membrane 102. Any known or yet-two-be-developed image processing algorithms may be utilized. For example an edge detection algorithm such as scale-invariant feature transform (SIFT) or speeded up robust features (SURF) may be used to detect the edges or boundaries of the deformable membrane 102. However embodiments are not limited to any particular image processing algorithm. As described in more detail below, the images generated by the one or more external image sensors 150 may be compared against an ideal geometry to determine if the measured deformable membrane 102 is properly calibrated.

In some embodiments, the robot (e.g., robot 200' shown in FIG. 13) has one or more image sensors associated therewith that may be used as the one or more external image sensors 150. For example, a head of the robot may include an image sensor used for functions such as navigation and facial recognition. This image sensor may also be used as an external image sensor 150 for calibration as described herein. For example, if the robot includes a deformable sensor 100 on its arm, the robot may control the arm such that the deformable sensor 100 is in front of its head and therefore the image sensor. The image sensor, acting as the external image sensors 150 described herein, may gather image data for calibration.

Figure 12:
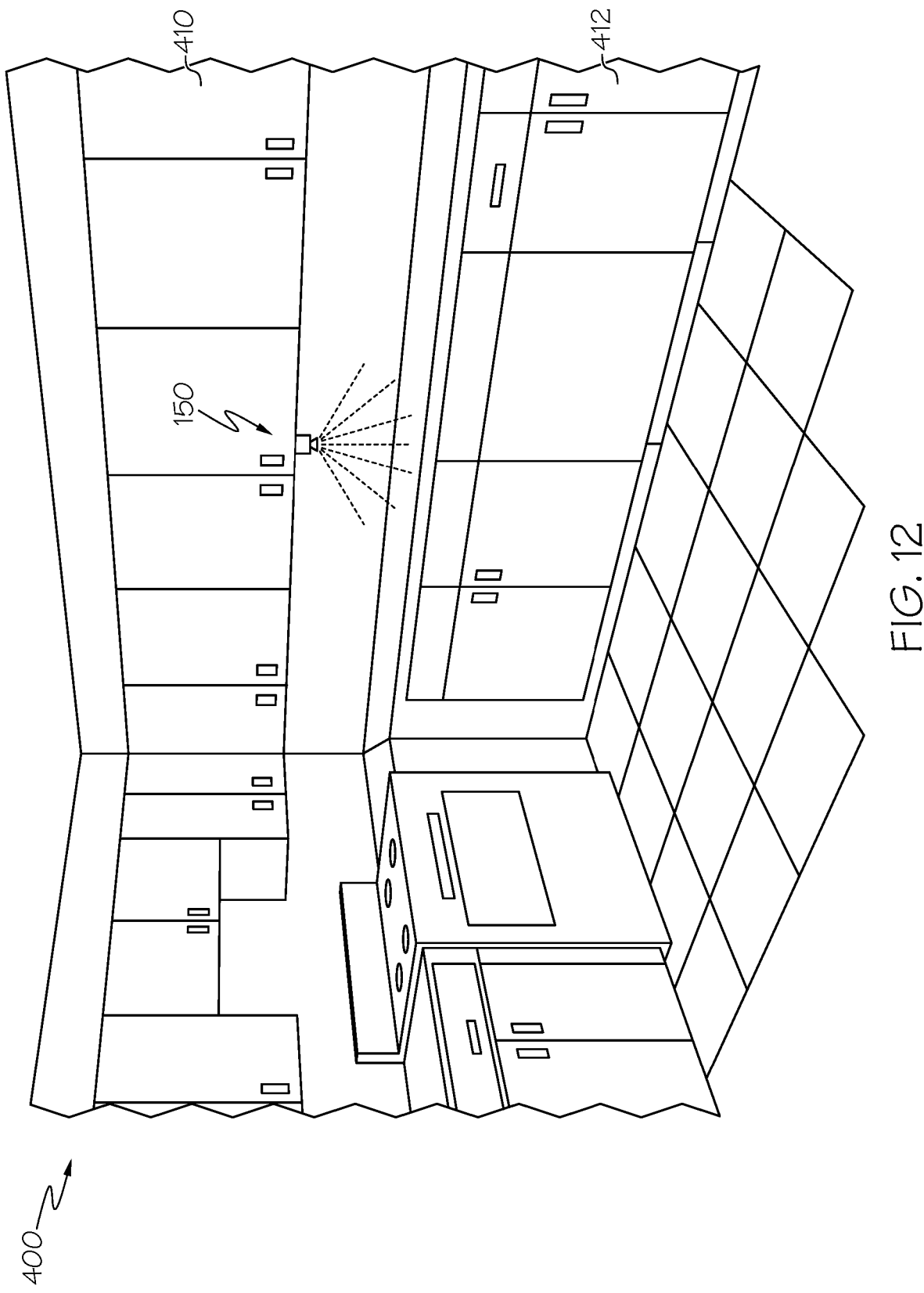
FIG. 12 schematically depicts an example working environment of a robot and a system for calibrating a deformable sensor according to one or more embodiments described and illustrated herein.

The one or more external image sensors 150 may be disposed anywhere where the robot is operating. In one example, the robot 200 may navigate to a calibration location where the one or more external image sensors 150 are present. Referring now to FIG. 12, an example kitchen setting 400 is illustrated. A robot (not shown) may be configured as a home use robot that assists a user with home-based tasks. The robot may have one or more deformable sensors attached to its body at one or more locations. For example the robot may have a deformable sensor is an end-effector on each arm or the robot may have one or more deformable sensors on the core of its body. The one or more external image sensors 150 may be placed at a location accessible to the robot. In some cases, the external image sensors 150 may be placed inconspicuously within the robot's working environment. In the example of FIG. 12, and external image sensor 150 is placed underneath the kitchen cabinet 410 and above a kitchen countertop 412. When it is time for the robot to calibrate the deformable sensor the robot may navigate to the location of the external image sensors 150 and place the deformable sensor within a field of view of the external image sensor 150. In the illustrated example, the robot may stick its arms underneath the kitchen cabinets 410 so that the deformable sensor is underneath external image sensor 150.

The external image sensor may then capture image data of the deformable sensor and either process it directly to form an image of the deformable sensor or send the data to an external computer or the robot itself for processing to generate the image of the deformable sensor. As a non-limiting example, the robot may autonomously move to the calibration location where the external image sensor 150 is located. The robot may travel to the calibration location periodically to ensure that the deformable sensor is properly inflated. As another non-limiting example, a human operator may control or otherwise instruct the robot to the calibration location to be calibrated.

Figure 13:
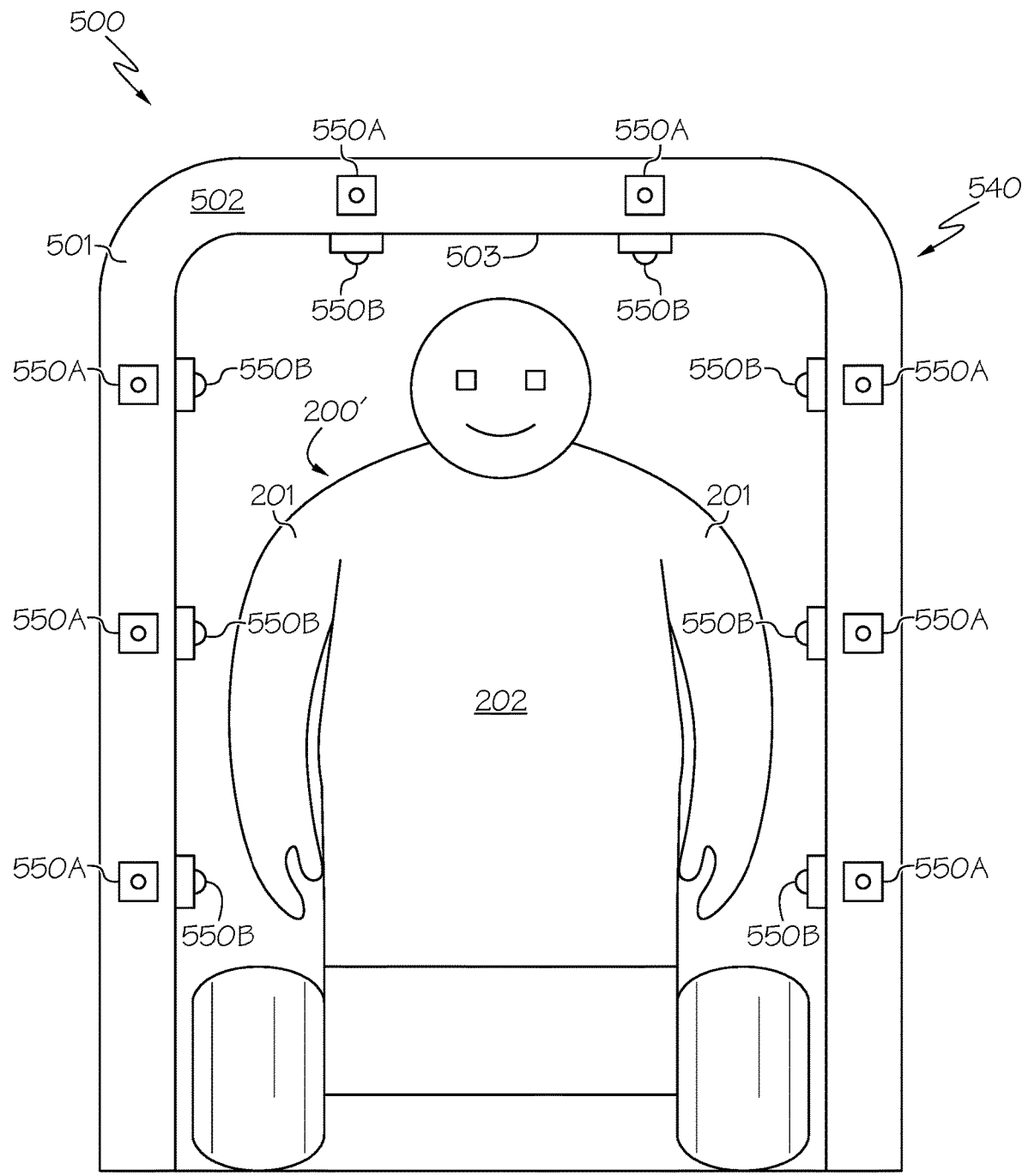
FIG. 13 schematically depicts a robot having deformable sensors and a system for calibrating deformable sensors according to one or more embodiments described and illustrated herein.

Referring now to FIG. 13, an example calibration station 500 configured as an archway structure or gate is schematically illustrated. A robot 200' is shown passing through the calibration station 500. Generally, the robot includes a body portion 202 arms 201, as well as hands and wheels. The robot's body 202 and arms 201 may be inflatable and defined by one or more deformable sensors. The deformable sensors may enable the robot to be soft to the touch such that a human may contact the robot 200 e.g., give the robot a hug. Because the robot is so large and has many deformable sensors associated therewith, it may be desirable to use many external image sensors to generate calibration images of the robot 200'. It should be understood that embodiments are not limited to the robot 200' illustrated by FIG. 13.

In the illustrated example, calibration station 500 includes a frame 501 having a plurality of external image sensors coupled thereto. An outer surface 501 of the frame may have a plurality of first external sensors 550A. An inner surface 503 of the frame 502 also has a plurality of second external image sensors 550B. The surface of the frame 500 that is opposite surface 502 may also have a plurality of external image sensors disposed thereon. The plurality of external image sensors are configured to generate image data of the robot 200' as it passes through the calibration station 500.

The image data is then processed to generate one or more calibration images of the robot 200'. The image data may be processed by the robot 200', the external image sensors themselves, or a remote computer (not shown). The resulting one or more calibration images are then compared against a metric, as described in more detail below.

Figure 14:
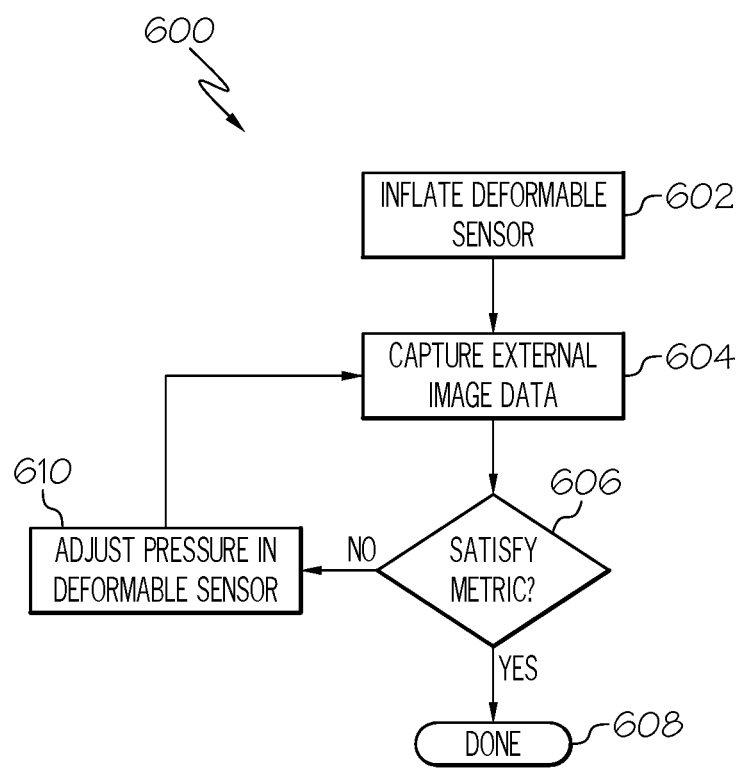
FIG. 14 depicts an example method for calibrating a deformable sensor according to one or more embodiments described and illustrated herein.

FIG. 14 illustrates an example process 600 of calibrating a deformable sensor 100. At block 602 the deformable sensor 100 is inflated to a desired pressure. The pressure may be established by a predetermined set-point, for example. The set point may inflate the deformable sensor 100 to the desired size and/shape of the deformable membrane 102. As stated above, the medium may be air or some other fluid that is inputted into the enclosure 113 of the deformable sensor 100. Due to manufacturing or other issues the pressure set point may not cause the deformable sensor 100 to have the proper size and/or shape of the deformable membrane 102. This may lead to errors such as the inability to detect a type of object or because of an object. Thus the deformable sensor 100 should be calibrated.

At block 604 external image data is captured by one or more external image sensors 150. The one or more external image sensors 150 may be any of the types of sensors described above. Within this step the external sensor data is processed to form one or more calibration images.

At block 606 the one or more calibration images based on the image data is compared against a metric. When the one or more calibration images satisfy the metric the process moves to block 608 where it is completed. When the one or more calibration images do not satisfy the metric the process moves to block 610. At block 610 the pressure within the deformable sensor 100 is adjusted accordingly, (e.g., the deformable sensor is further inflated or deflated). The process then moves back to block 604 were additional image data is captured and the process repeats until the one or more calibration images satisfy the metric. In this manner, the deformable sensor 100 is calibrated to its proper size and/or shape.

Embodiments of the present disclosure are not limited by the type of metric that is utilized. In one non-limiting example, the metric is satisfied when the geometry of the deformable membrane 102 as indicated by the one or more calibration images is within a threshold tolerance of an ideal geometry. Referring back to FIGS. 10A-10C, an ideal geometry DG is illustrated. As shown in FIGS. 10A and 10B, the deformable membrane 102 differs from the ideal geometry DG by an amount diff at a certain location along the deformable membrane 102. When the amount diff is greater than a threshold distance, the metric may be deemed to not be satisfied. Whether or the difference amount is positive or negative determines whether the pressure is decreased or increased. When the geometry of the deformable membrane 102 is larger than the ideal geometry, adjustment of the pressure within the enclosure 113 is performed by decreasing the pressure. When the geometry of the deformable membrane is smaller than the ideal geometry, adjustment of the pressure within the enclosure is performed by increasing the pressure.

In FIG. 10C, there are two points that are measured, $diff_1$ and $diff_2$, that may be greater than a threshold distance. It should be understood that this method of determining whether or not the metric is satisfied is merely one example of the myriad of ways to determine if the metric is satisfied. In another non-limiting example, an image similarity algorithm used to determine the similarity between the calibration image and a metric image. The metric image may be an image of a deformable sensor having the proper size and/or shape. A similarity value between the two images may be calculated. When the similarity value is above a threshold value and therefore indicating high similarity, the process may move to block 608 and be completed. When the similarity value is below the threshold value and therefore indicating low similarity, the process may move to block 610 so that the pressure inside the enclosure may be adjusted.

In this manner, the one or more external image sensors 150 may be used to calibrate one or more deformable sensors 100.

In addition to being used for calibration purposes, the data from the one or more external sensors 150 may also be used in the process to detect a type, geometry, and/or pose of an object. In other words, the data from the one or more external sensors 150 may be used in conjunction with the data of the deformable sensor 100 to detect the type, geometry and/or pose of an object, such as the process described above with respect to FIG. 4.

Figure 15:
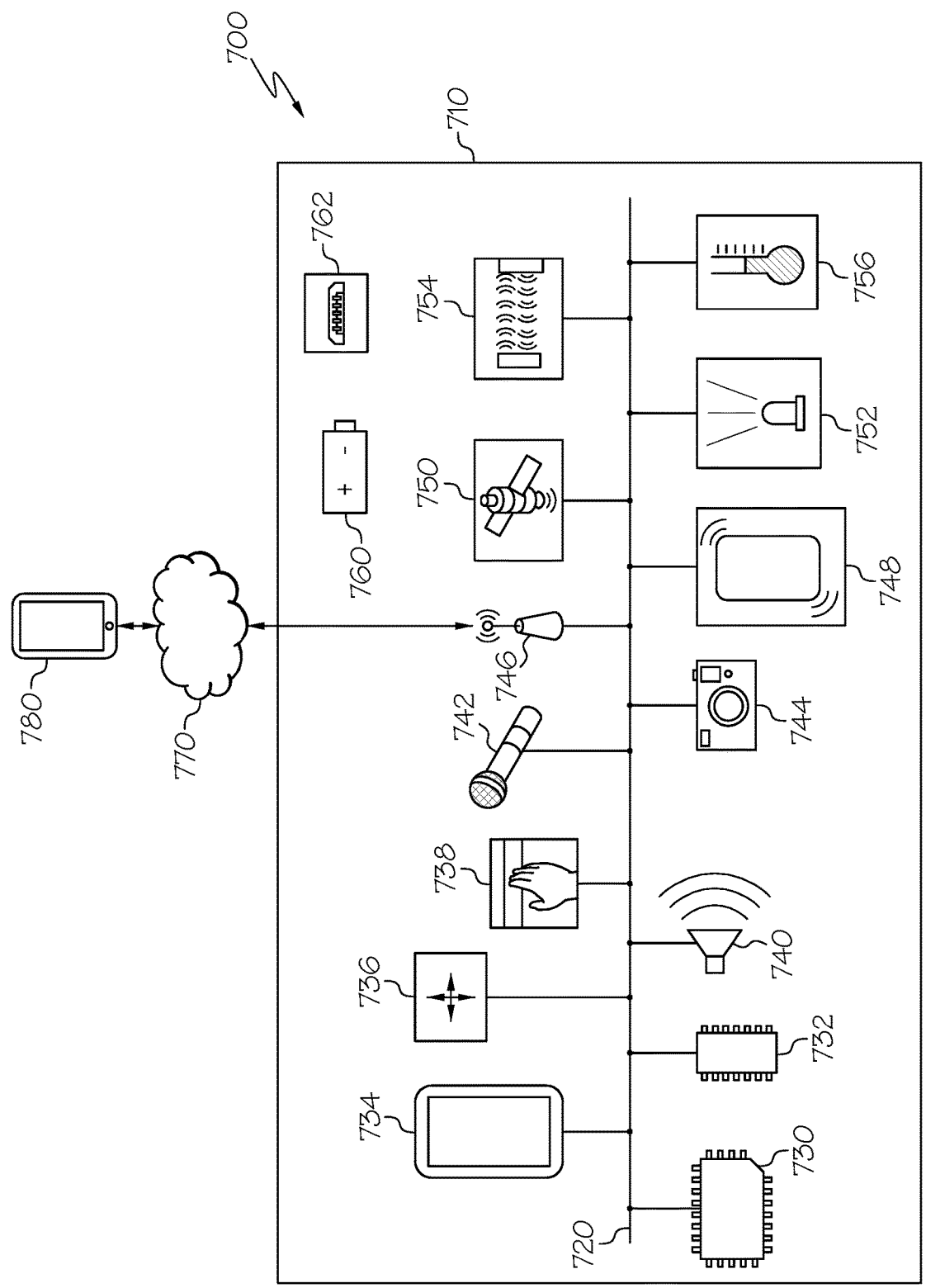
FIG. 15 is a block diagram illustrating hardware utilized in one or more robots for implementing various processes and systems, according one or more embodiments described and illustrated herein.

Turning now to FIG. 15, example components of one non-limiting embodiment of a robot 700 is schematically depicted. The robot 700 includes a housing 710, a communication path 720, a processor 730, a memory module 732, a tactile display 734, an inertial measurement unit 736, an input device 738, an audio output device 740 (e.g., a speaker), a microphone 742, a camera 744, network interface hardware 746, a tactile feedback device 748, a location sensor 750, a light 752, a proximity sensor 754, a temperature sensor 756, a motorized wheel assembly 758, a battery 760, and a charging port 762. The components of the robot 700 other than the housing 710 may be contained within or mounted to the housing 710. The various components of the robot 700 and the interaction thereof will be described in detail below. It should be understood that robots of the present disclosure may include more or fewer components than illustrated by FIG. 15.

The communication path 720 may be formed from any medium that is capable of transmitting a signal such as, for example, conductive wires, conductive traces, optical waveguides, or the like. Moreover, the communication path 720 may be formed from a combination of mediums capable of transmitting signals. In one embodiment, the communication path 720 comprises a combination of conductive traces, conductive wires, connectors, and buses that cooperate to permit the transmission of electrical data signals to components such as processors, memories, sensors, input devices, output devices, and communication devices. Accordingly, the communication path 720 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 720 communicatively couples the various components of the robot 700. As used herein, the term "communicatively coupled" means that coupled components are capable of exchanging data signals with one another such as, for example, electrical signals via conductive medium, electromagnetic signals via air, optical signals via optical waveguides, and the like.

The processor 730 of the robot 700 may be any device capable of executing machine-readable instructions. Accordingly, the processor 730 may be a controller, an integrated circuit, a microchip, a computer, or any other computing device. The processor 730 may be communicatively coupled to the other components of the robot 700 by the communication path 720. This may, in various embodiments, allow the processor 730 to receive data from the one or more deformable sensors 100 which may be part of the robot 700. In other embodiments, the processor 730 may receive data directly from one or more internal sensors 130 which are part of one or more deformable sensors 100 on a robot 700. Accordingly, the communication path 720 may communicatively couple any number of processors with one another, and allow the components coupled to the communication path 720 to operate in a distributed computing environment. Specifically, each of the components may operate as a node that may send and/or receive data. While the embodiment depicted in FIG. 15 includes a single processor 730, other embodiments may include more than one processor.

Still referring to FIG. 15, the memory module 732 of the robot 700 is coupled to the communication path 720 and communicatively coupled to the processor 730. The memory module 732 may, for example, contain instructions to detect a shape of an object that has deformed the deformable membrane 120 of a deformable sensor 100. In this example, these instructions stored in the memory module 732, when executed by the processor 730, may allow for the determination of the shape of an object based on the observed deformation of the deformable membrane 120, and/or may allow for determination as to whether or not image data from one or more external image sensors satisfy a metric regarding calibration. The memory module 732 may comprise RAM, ROM, flash memories, hard drives, or any non-transitory memory device capable of storing machine-readable instructions such that the machine-readable instructions can be accessed and executed by the processor 730. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 732. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 15 includes a single memory module 732, other embodiments may include more than one memory module.

The tactile display 734, if provided, is coupled to the communication path 720 and communicatively coupled to the processor 730. The tactile display 734 may be any device capable of providing tactile output in the form of refreshable tactile messages. A tactile message conveys information to a user by touch. A tactile message may also be in the form of any shape, such as the shape of an object detected in the environment. The tactile display 734 may provide information to the user regarding the operational state of the robot 700.

The inertial measurement unit 736, if provided, is coupled to the communication path 720 and communicatively coupled to the processor 730. The inertial measurement unit 736 may include one or more accelerometers and one or more gyroscopes. The inertial measurement unit 736 transforms sensed physical movement of the robot 700 into a signal indicative of an orientation, a rotation, a velocity, or an acceleration of the robot 700. The operation of the robot 700 may depend on an orientation of the robot 700 (e.g., whether the robot 700 is horizontal, tilted, and the like). Some embodiments of the robot 700 may not include the inertial measurement unit 736, such as embodiments that include an accelerometer but not a gyroscope, embodiments that include a gyroscope but not an accelerometer, or embodiments that include neither an accelerometer nor a gyroscope.

Still referring to FIG. 15, one or more input devices 738 are coupled to the communication path 720 and communicatively coupled to the processor 730. The input device 738 may be any device capable of transforming user contact into a data signal that can be transmitted over the communication path 720 such as, for example, a button, a switch, a knob, a microphone or the like. In various embodiments an input device 738 may be a deformable sensor 100 and/or an internal sensor 130 as described above. In some embodiments, the input device 738 includes a power button, a volume button, an activation button, a scroll button, or the like. The one or more input devices 738 may be provided so that the user may interact with the robot 700, such as to navigate menus, make selections, set preferences, and other functionality described herein. In some embodiments, the input device 738 includes a pressure sensor, a touch-sensitive region, a pressure strip, or the like. It should be understood that some embodiments may not include the input device 738. As described in more detail below, embodiments of the robot 700 may include multiple input devices disposed on any surface of the housing 710. In some embodiments, one or more of the input devices 738 are configured as a fingerprint sensor for unlocking the robot. For example, only a user with a registered fingerprint may unlock and use the robot 700.

The speaker 740 (i.e., an audio output device) is coupled to the communication path 720 and communicatively coupled to the processor 730. The speaker 740 transforms audio message data from the processor 730 of the robot 700 into mechanical vibrations producing sound. For example, the speaker 740 may provide to the user navigational menu information, setting information, status information, information regarding the environment as detected by image data from the one or more cameras 744, and the like. However, it should be understood that, in other embodiments, the robot 700 may not include the speaker 740.

The microphone 742 is coupled to the communication path 720 and communicatively coupled to the processor 730. The microphone 742 may be any device capable of transforming a mechanical vibration associated with sound into an electrical signal indicative of the sound. The microphone 742 may be used as an input device 738 to perform tasks, such as navigate menus, input settings and parameters, and any other tasks. It should be understood that some embodiments may not include the microphone 742.

Still referring to FIG. 15, the camera 744 is coupled to the communication path 720 and communicatively coupled to the processor 730. The camera 744 may be any device having an array of sensing devices (e.g., pixels) capable of detecting radiation in an ultraviolet wavelength band, a visible light wavelength band, or an infrared wavelength band. The camera 744 may have any resolution. The camera 744 may be an omni-directional camera, or a panoramic camera. In some embodiments, one or more optical components, such as a mirror, fish-eye lens, or any other type of lens may be optically coupled to the camera 744.

The network interface hardware 746 is coupled to the communication path 720 and communicatively coupled to the processor 730. The network interface hardware 746 may be any device capable of transmitting and/or receiving data via a network 770. Accordingly, network interface hardware 746 can include a wireless communication module configured as a communication transceiver for sending and/or receiving any wired or wireless communication. For example, the network interface hardware 746 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 746 includes hardware configured to operate in accordance with the Bluetooth wireless communication protocol. In another embodiment, network interface hardware 746 may include a Bluetooth send/receive module for sending and receiving Bluetooth communications to/from a portable electronic device 780. The network interface hardware 746 may also include a radio frequency identification ("RFD") reader configured to interrogate and read RFID tags.

In some embodiments, the robot 700 may be communicatively coupled to a portable electronic device 780 via the network 770. In some embodiments, the network 770 is a personal area network that utilizes Bluetooth technology to communicatively couple the robot 700 and the portable electronic device 780. In other embodiments, the network 770 may include one or more computer networks (e.g., a personal area network, a local area network, or a wide area network), cellular networks, satellite networks and/or a global positioning system and combinations thereof. Accordingly, the robot 700 can be communicatively coupled to the network 770 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 15, as stated above, the network 770 may be utilized to communicatively couple the robot 700 with the portable electronic device 780. The portable electronic device 780 may include a mobile phone, a smartphone, a personal digital assistant, a camera, a dedicated mobile media player, a mobile personal computer, a laptop computer, and/or any other portable electronic device capable of being communicatively coupled with the robot 700. The portable electronic device 780 may include one or more processors and one or more memories. The one or more processors can execute logic to communicate with the robot 700. The portable electronic device 780 may be configured with wired and/or wireless communication functionality for communicating with the robot 700. In some embodiments, the portable electronic device 780 may perform one or more elements of the functionality described herein, such as in embodiments in which the functionality described herein is distributed between the robot 700 and the portable electronic device 780.

The tactile feedback device 748 is coupled to the communication path 720 and communicatively coupled to the processor 730. The tactile feedback device 748 may be any device capable of providing tactile feedback to a user. The tactile feedback device 748 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 748.

The location sensor 750 is coupled to the communication path 720 and communicatively coupled to the processor 730. The location sensor 750 may be any device capable of generating an output indicative of a location. In some embodiments, the location sensor 750 includes a global positioning system (GPS) sensor, though embodiments are not limited thereto. Some embodiments may not include the location sensor 750, such as embodiments in which the robot 700 does not determine a location of the robot 700 or embodiments in which the location is determined in other ways (e.g., based on information received from the camera 744, the microphone 742, the network interface hardware 746, the proximity sensor 754, the inertial measurement unit 736 or the like). The location sensor 750 may also be configured as a wireless signal sensor capable of triangulating a location of the robot 700 and the user by way of wireless signals received from one or more wireless signal antennas.

The motorized wheel assembly 758 is coupled to the communication path 720 and communicatively coupled to the processor 730. As described in more detail below, the motorized wheel assembly 758 includes motorized wheels (not shown) that are driven by one or motors (not shown). The processor 730 may provide one or more drive signals to the motorized wheel assembly 758 to actuate the motorized wheels such that the robot 700 travels to a desired location, such as a location that the user wishes to acquire environmental information (e.g., the location of particular objects within at or near the desired location).

Still referring to FIG. 15, the light 752 is coupled to the communication path 720 and communicatively coupled to the processor 730. The light 752 may be any device capable of outputting light, such as, but not limited to, a light emitting diode, an incandescent light, a fluorescent light, or the like. Some embodiments include a power indicator light that is illuminated when the robot 700 is powered on. Some embodiments include an activity indicator light that is illuminated when the robot 700 is active or processing data. Some embodiments include an illumination light for illuminating the environment in which the robot 700 is located. Some embodiments may not include the light 752.

The proximity sensor 754 is coupled to the communication path 720 and communicatively coupled to the processor 730. The proximity sensor 754 may be any device capable of outputting a proximity signal indicative of a proximity of the robot 700 to another object. In some embodiments, the proximity sensor 754 may include a laser scanner, a capacitive displacement sensor, a Doppler effect sensor, an eddy-current sensor, an ultrasonic sensor, a magnetic sensor, an internal sensor, a radar sensor, a lidar sensor, a sonar sensor, or the like. Some embodiments may not include the proximity sensor 754, such as embodiments in which the proximity of the robot 700 to an object is determine from inputs provided by other sensors (e.g., the camera 744, the speaker 740, etc.) or embodiments that do not determine a proximity of the robot 700 to an object.

The temperature sensor 756 is coupled to the communication path 720 and communicatively coupled to the processor 730. The temperature sensor 756 may be any device capable of outputting a temperature signal indicative of a temperature sensed by the temperature sensor 756. In some embodiments, the temperature sensor 756 may include a thermocouple, a resistive temperature device, an infrared sensor, a bimetallic device, a change of state sensor, a thermometer, a silicon diode sensor, or the like. Some embodiments of the robot 700 may not include the temperature sensor 756.

Still referring to FIG. 15, the robot 700 is powered by the battery 760, which is electrically coupled to the various electrical components of the robot 700. The battery 760 may be any device capable of storing electric energy for later use by the robot 700. In some embodiments, the battery 760 is a rechargeable battery, such as a lithium-ion battery or a nickel-cadmium battery. In embodiments in which the battery 760 is a rechargeable battery, the robot 700 may include the charging port 762, which may be used to charge the battery 760. Some embodiments may not include the battery 760, such as embodiments in which the robot 700 is powered the electrical grid, by solar energy, or by energy harvested from the environment. Some embodiments may not include the charging port 762, such as embodiments in which the apparatus utilizes disposable batteries for power.

Figure 16:
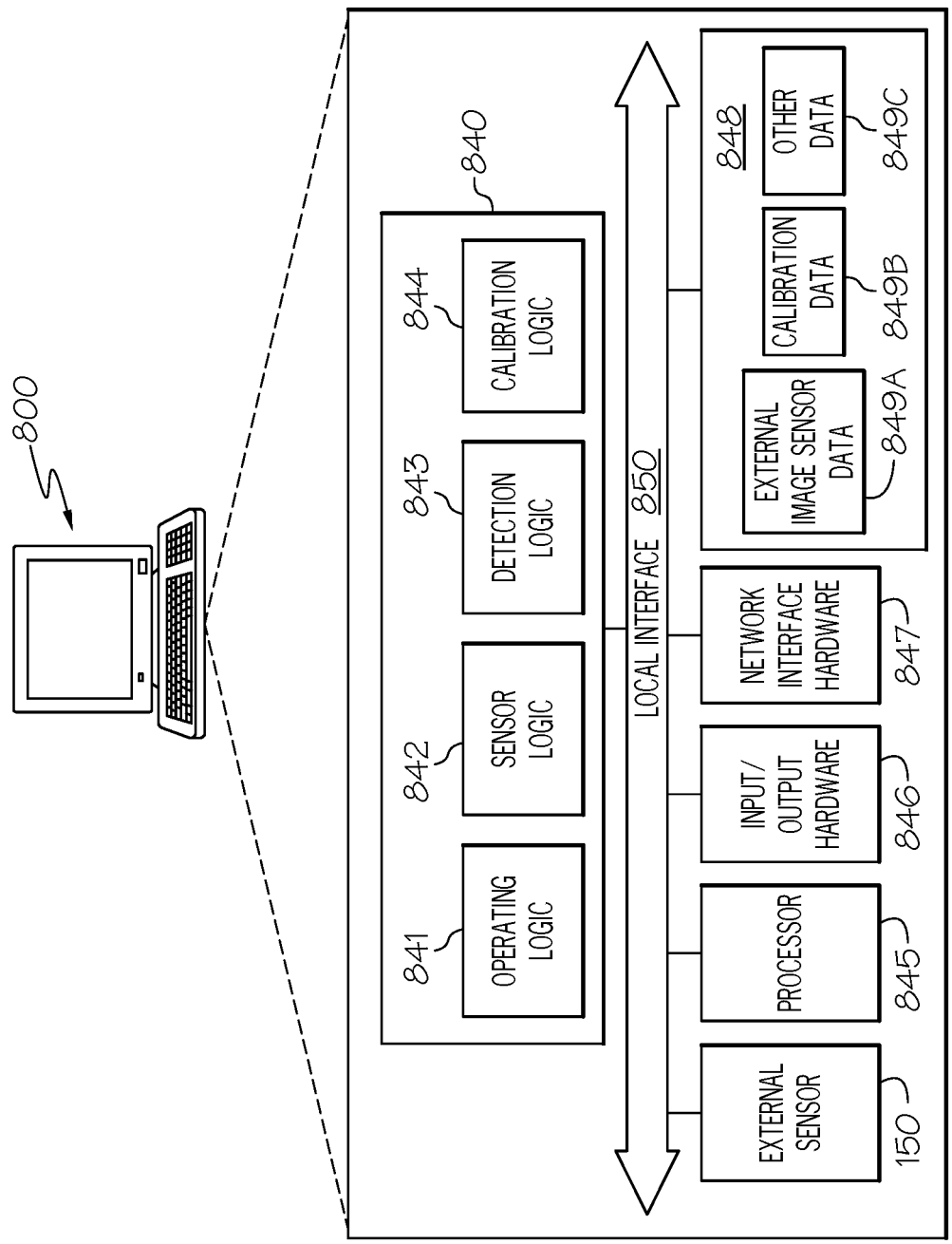
FIG. 16 is a block diagram illustrating hardware utilized for performing deformable sensor calibration according to one or more embodiments described and illustrated herein.

Referring now to FIG. 16, an example computing device 800 operable to perform the calibration functionalities described herein is schematically illustrated. The computing device 800 may be any computing device, and may also be implemented in a robot (i.e., the robot includes the hardware and software for performing the calibration functions described herein).

The example computing device 800 provides a system for calibrating a deformable sensor, and/or a non-transitory computer usable medium having computer readable program code for calibrating a deformable sensor embodied as hardware, software, and/or firmware, according to embodiments shown and described herein. While in some embodiments, the computing device 800 may be configured as a general purpose computer with the requisite hardware, software, and/or firmware, in some embodiments, the computing device 800 may be configured as a mobile phone, a vehicle, an electric appliance, and the like. It should be understood that the software, hardware, and/or firmware components depicted in FIG. 16 may also be provided in other computing devices external to the computing device 800 (e.g., data storage devices, remote server computing devices, and the like).

As also illustrated in FIG. 16, the computing device 800 (or other additional computing devices) may include an external image sensor 150 for generating image data of a deformable sensor, a processor 845, input/output hardware 846, network interface hardware 847, a data storage component 848 (which may include external image sensor data 849A, calibration data 849B, and any other data 849C for performing the functionalities described herein), and a non-transitory memory component 840. The memory component 840 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 840 may be configured to store operating logic 841, sensor logic for receiving image data from one or more external image sensors 150, detection logic 843 for detecting a type of object an/or detecting a pose of an object, and calibration logic 844 for calibrating a deformable sensor based on external image sensor data 849A (each of which may be embodied as computer readable program code, firmware, or hardware, as an example). A local interface 850 is also included in FIG. 16 and may be implemented as a bus or other interface to facilitate communication among the components of the computing device 800.

The processor 845 may include any processing component configured to receive and execute computer readable code instructions (such as from the data storage component 848 and/or memory component 840). The input/output hardware 846 may include an electronic display, keyboard, mouse, printer, camera, microphone, speaker, touch-screen, and/or other device for receiving, sending, and/or presenting data. The network interface hardware 847 may include any wired or wireless networking hardware, such as a modem, LAN port, wireless fidelity (Wi-Fi) card, WiMax card, mobile communications hardware, and/or other hardware for communicating with other networks and/or devices, such as to receive the data from various sources, for example.

It should be understood that the data storage component 848 may reside local to and/or remote from the computing device 800, and may be configured to store one or more pieces of data for access by the computing device 800 and/or other components. As illustrated in FIG. 16, the data storage component 848 may include external image sensor data 849A, which in at least one embodiment includes image data generated by one or more external image sensors 150. The external image sensor data 849A may be stored in one or more data storage devices. Similarly, calibration data 849B may be stored by the data storage component 848 and may include information relating to the calibration of the deformable sensors. Calibration data 849B may include, but is not limited to, metric thresholds and metric images of ideal deformable sensors that are compared against the calibration images of deformable sensors under calibration. Other data 149C used to perform the functionalities described herein may also be stored in the data storage component 848. In some embodiments, the computing device 800 may be coupled to a remote server or other data storage device that stores the relevant data.

Included in the memory component 840 may be the operating logic 841, the sensor logic 842, the detection logic 843, and the calibration logic 844. The operating logic 841 may include an operating system and/or other software for managing components of the computing device 800. The sensor logic 842 may reside in the memory component 840 and may be configured to receive and store image data from one or more external image sensors 150. The detection logic 843 may be configured to use data from a deformable sensor and/or one or more external image sensors to detect a type of object and/or a pose of an object. The calibration logic 844 is configured to calibrate a deformable sensor by comparing image data of the deformable sensor to a metric, and adjusting a pressure within deformable sensor based on the comparison.

The components illustrated in FIG. 16 are merely exemplary and are not intended to limit the scope of this disclosure. More specifically, while the components in FIG. 16 are illustrated as residing within the computing device 800, this is a non-limiting example. In some embodiments, one or more of the components may reside external to the computing device 800.

It should now be understood that embodiments of the present disclosure are directed to systems and methods for calibrating deformable sensors. Deformable sensors, despite being inflated to a proper pressure value, may still be too large, too small, or misshaped, each of which may cause errors in the operation of the deformable sensors. In embodiments, one or more external image sensors are used to generate image data of a deformable sensor that is compared against a metric. When the image data does not satisfy the metric, the pressure within the deformable sensor is adjusted until the image data satisfies the metric. In this manner, the deformable sensor has an accurate size and/or shape, which leads to more accurate detections of the type of an object and/or a pose of an object.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of calibrating a deformable sensor, the method comprising:
capturing image data of the deformable sensor using an external image sensor, wherein the deformable sensor comprises a deformable membrane defining an enclosure that is configured to be filled with a medium, and the deformable membrane comprises a filter layer on a surface of the deformable membrane configured to assist in detection of a deformation of the deformable membrane;
comparing the image data of the deformable sensor to a metric to generate a similarity value defining a degree of a difference between the deformable membrane in the image data and a geometry of the deformable membrane corresponding to the metric; and
adjusting a pressure within the enclosure based on the similarity value.

2. The method of claim 1, wherein the deformable sensor further comprises an optical sensor disposed within the enclosure and having a field of view configured to be directed toward a bottom surface of the deformable membrane.

3. The method of claim 1, wherein:
comparing the image data of the deformable sensor comprises determining a geometry of the deformable membrane based on the image data; and
the metric is satisfied when the geometry of the deformable membrane is within a threshold tolerance of an ideal geometry.

4. The method of claim 3, wherein:
when the geometry of the deformable membrane is larger than the ideal geometry, adjusting of the pressure within the enclosure comprises decreasing the pressure; and
when the geometry of the deformable membrane is smaller than the ideal geometry, adjusting the pressure within the enclosure comprises increasing the pressure.

5. The method of claim 1, wherein the external image sensor comprises a depth sensor.

6. The method of claim 1, wherein the comparing of the image data of the deformable sensor to the metric comprises applying an image similarity algorithm.

7. The method of claim 1, further comprising, using the image data, detecting at least one of a type of an object, a geometry of the object and a pose of the object.

8. A system comprising:
a deformable sensor comprising a deformable membrane defining an enclosure that is configured to be filled with a medium, and the deformable membrane comprises a filter layer on a surface of the deformable membrane configured to assist in detection of a deformation of the deformable membrane;
an external image sensor external to the deformable sensor;
a processor; and
a non-transitory computer readable medium storing instructions that, when executed by the processor, causes the processor to:
capture image data of the deformable sensor using the external image sensor;
compare the image data of the deformable sensor to a metric to generate a similarity value defining a degree of a difference between the deformable membrane in the image data and a geometry of the deformable membrane corresponding to the metric; and
adjust a pressure within the enclosure based on the similarity value.

9. The system of claim 8, wherein the deformable sensor further comprises an optical sensor disposed within the enclosure and having a field of view configured to be directed toward a bottom surface of the deformable membrane.

10. The system of claim 8, wherein:
- comparing the image data of the deformable sensor comprises determining a geometry of the deformable membrane based on the image data; and
- the metric is satisfied when the geometry of the deformable membrane is within a threshold tolerance of an ideal geometry.

11. The system of claim 10, wherein:
- when the geometry of the deformable membrane is larger than the ideal geometry, of to adjust the pressure within the enclosure is performed by decreasing the pressure; and
- when the geometry of the deformable membrane is smaller than the ideal geometry, to adjust of the pressure within the enclosure is performed by increasing the pressure.

12. The system of claim 8, wherein the external image sensor comprises a depth sensor.

13. The system of claim 8, wherein the comparing of the image data of the deformable sensor to the metric comprises applying an image similarity algorithm.

14. The system of claim 8, wherein the instructions further cause the processor to, using the image data, detect at least one of a type of an object, a geometry of the object and a pose of the object.

\* \* \* \* \*